(12) United States Patent
Martin et al.

(10) Patent No.: US 8,206,035 B2
(45) Date of Patent: Jun. 26, 2012

(54) LOW-FRICTION SLIDING MECHANISM, LOW-FRICTION AGENT COMPOSITION AND METHOD OF FRICTION REDUCTION

(75) Inventors: Jean Michel Martin, Chazay d'Azergues (FR); Shigeki Takeshima, Yokohama (JP); Shozaburo Konishi, Yokohama (JP); Makoto Kano, Yokohama (JP); Yutaka Mabuchi, Yokohama (JP); Takao Ishikawa, Yokohama (JP); Takafumi Ueno, Yokohama (JP); Kiyotaka Nakamura, Yokohama (JP); Takahiro Hamada, Yokohama (JP)

(73) Assignees: Nissan Motor Co., Ltd., Yokohama-shi (JP); Nippon Oil Corporation, Tokyo (JP); Jean Michel Martin, D'Azergues (FR)

(\*) Notice: Subject to any disclaimer, the term of this patent is extended or adjusted under 35 U.S.C. 154(b) by 889 days.

(21) Appl. No.: 10/567,139
(22) PCT Filed: Aug. 6, 2004
(86) PCT No.: PCT/IB2004/002552
§ 371 (c)(1),
(2), (4) Date: Feb. 6, 2006
(87) PCT Pub. No.: WO2005/014761
PCT Pub. Date: Feb. 17, 2005

(65) Prior Publication Data
US 2006/0263604 A1   Nov. 23, 2006

(30) Foreign Application Priority Data

Aug. 6, 2003 (JP) ................. 2003-206197
Aug. 6, 2003 (JP) ................. 2003-206199
Aug. 21, 2003 (JP) ................. 2003-208264

(51) Int. Cl.
*F16C 17/00* (2006.01)
(52) U.S. Cl. ............ 384/13; 384/42; 384/297; 384/322; 384/492; 384/907; 384/907.1
(58) Field of Classification Search .............. 384/276, 384/492, 569, 907, 907.1, 912, 913, 13, 42, 384/297, 322; 428/833.2, 833.3, 833.4, 835
See application file for complete search history.

(56) References Cited

U.S. PATENT DOCUMENTS
1,461 A   12/1839 Hall et al.
(Continued)

FOREIGN PATENT DOCUMENTS
CA   2009582   8/1990
(Continued)

OTHER PUBLICATIONS

E. Meyer-Rässler—"Neuartige Laufflächen-Schutzverfahren für Kolben von Verbrennungsmotoren," VDI—Zeitschrift Bd. 86 Nr. 15/16, Apr. 18, 1942.

(Continued)

*Primary Examiner* — James Pilkington
(74) *Attorney, Agent, or Firm* — Foley & Lardner LLP

(57) ABSTRACT

The invention provides a low-friction sliding mechanism, a low-friction agent composition, a friction reduction method, a manual transmission and a final reduction gear unit that can exert very excellent low friction characteristics to sliding surfaces present under various applications, and, in particular, that have more excellent low friction characteristics than that of a combination of an existing steel material and an organic Mo compound.

The low-friction sliding mechanism has an oxygen-containing organic compound or an aliphatic amine compound interposed between sliding surfaces that a DLC coated sliding member and a sliding member form.

The low-friction agent composition contains an oxygen-containing organic compound or an aliphatic amine compound. The friction reduction method includes supplying the low-friction agent composition between sliding surfaces that a DLC coated sliding member and a sliding member form.

The manual transmission includes, as at least one of sliding members, a DLC coated sliding section.

The final reduction gear unit includes, as at least one of sliding members, a DLC coated sliding section.

14 Claims, 6 Drawing Sheets

U.S. PATENT DOCUMENTS

| | | | |
|---|---|---|---|
| 2,716,972 A | 9/1955 | Paul et al. | |
| 2,982,733 A | 5/1961 | Wright et al. | |
| 3,196,109 A * | 7/1965 | Morway et al. | 508/155 |
| 3,211,647 A | 10/1965 | Rosemary et al. | |
| 3,790,315 A | 2/1974 | Emanuelss et al. | |
| 3,846,162 A | 11/1974 | Bloom | |
| 3,932,228 A | 1/1976 | Sugiyama et al. | |
| 4,031,023 A | 6/1977 | Musser et al. | |
| 4,367,130 A | 1/1983 | Lemelson | |
| 4,385,880 A | 5/1983 | Lemelson | |
| 4,538,929 A | 9/1985 | Ehrentraut et al. | |
| 4,554,208 A | 11/1985 | MacIver et al. | |
| 4,645,610 A | 2/1987 | Born et al. | |
| 4,702,808 A | 10/1987 | Lemelson | |
| 4,712,982 A | 12/1987 | Inagaki et al. | |
| 4,755,237 A | 7/1988 | Lemelson | |
| 4,755,426 A | 7/1988 | Kokai et al. | |
| 4,783,368 A | 11/1988 | Yamamoto et al. | |
| 4,795,577 A * | 1/1989 | Hart et al. | 508/221 |
| 4,834,400 A | 5/1989 | Lebeck | |
| 4,842,755 A | 6/1989 | Dunn | |
| 4,859,493 A | 8/1989 | Lemelson | |
| 4,874,596 A | 10/1989 | Lemelson | |
| 4,919,974 A | 4/1990 | McCune et al. | |
| 4,933,058 A | 6/1990 | Bache et al. | |
| 4,943,345 A | 7/1990 | Asmussen et al. | |
| 4,960,643 A | 10/1990 | Lemelson | |
| 4,974,498 A | 12/1990 | Lemelson | |
| 4,980,021 A | 12/1990 | Kitamura et al. | |
| 4,980,610 A | 12/1990 | Varga | |
| 4,981,717 A | 1/1991 | Thaler | |
| 4,988,421 A | 1/1991 | Drawl et al. | |
| 4,992,082 A | 2/1991 | Drawl et al. | |
| 5,000,541 A | 3/1991 | DiMarcello et al. | |
| 5,021,628 A | 6/1991 | Lemelson | |
| 5,032,243 A | 7/1991 | Bache et al. | |
| 5,036,211 A | 7/1991 | Scott | |
| 5,040,501 A | 8/1991 | Lemelson | |
| 5,064,547 A * | 11/1991 | Rubin | 508/440 |
| 5,067,826 A | 11/1991 | Lemelson | |
| 5,077,990 A | 1/1992 | Plath | |
| 5,078,848 A | 1/1992 | Anttila et al. | |
| 5,087,608 A | 2/1992 | Chan et al. | |
| 5,096,352 A | 3/1992 | Lemelson | |
| 5,108,633 A * | 4/1992 | Buckley, III | 508/562 |
| 5,110,435 A | 5/1992 | Haberland | |
| 5,112,025 A | 5/1992 | Nakayama et al. | |
| 5,127,314 A | 7/1992 | Swain | |
| 5,131,941 A | 7/1992 | Lemelson | |
| 5,132,587 A | 7/1992 | Lemelson | |
| 5,142,785 A | 9/1992 | Grewal et al. | |
| 5,143,634 A | 9/1992 | Quinga et al. | |
| 5,148,780 A | 9/1992 | Urano et al. | |
| 5,187,021 A | 2/1993 | Vydra et al. | |
| 5,190,807 A | 3/1993 | Kimock et al. | |
| 5,190,824 A | 3/1993 | Itoh | |
| 5,202,156 A | 4/1993 | Yamamoto et al. | |
| 5,205,188 A | 4/1993 | Repenning et al. | |
| 5,205,305 A | 4/1993 | Yamakita | |
| H1210 H | 7/1993 | Jansen | |
| 5,232,568 A | 8/1993 | Parent et al. | |
| 5,237,967 A | 8/1993 | Willermet et al. | |
| 5,249,554 A | 10/1993 | Tamor et al. | |
| 5,255,783 A | 10/1993 | Goodman et al. | |
| 5,255,929 A | 10/1993 | Lemelson | |
| 5,282,990 A | 2/1994 | Yoneto et al. | |
| 5,284,394 A | 2/1994 | Lemelson | |
| 5,288,556 A | 2/1994 | Lemelson | |
| 5,295,305 A | 3/1994 | Hahn et al. | |
| 5,299,937 A | 4/1994 | Gow | |
| 5,317,938 A | 6/1994 | de Juan, Jr. et al. | |
| 5,326,488 A | 7/1994 | Minokami et al. | |
| 5,332,348 A | 7/1994 | Lemelson | |
| 5,334,306 A | 8/1994 | Dautremont-Smith et al. | |
| 5,349,265 A | 9/1994 | Lemelson | |
| 5,358,402 A | 10/1994 | Reed et al. | |
| 5,359,170 A | 10/1994 | Chen et al. | |
| 5,360,227 A | 11/1994 | Lemelson | |
| 5,380,196 A | 1/1995 | Kelly et al. | |
| 5,401,543 A | 3/1995 | O'Neill et al. | |
| H1461 H | 7/1995 | DiVita et al. | |
| 5,432,539 A | 7/1995 | Anderson | |
| 5,433,977 A | 7/1995 | Sarin et al. | |
| H1471 H | 8/1995 | Braun et al. | |
| 5,443,032 A | 8/1995 | Vichr et al. | |
| 5,447,208 A | 9/1995 | Lund et al. | |
| 5,456,406 A | 10/1995 | Lemelson | |
| 5,458,754 A | 10/1995 | Sathrum et al. | |
| 5,461,648 A | 10/1995 | Nauflett et al. | |
| 5,462,772 A | 10/1995 | Lemelson | |
| 5,464,667 A | 11/1995 | Koehler et al. | |
| 5,466,431 A | 11/1995 | Dorfman et al. | |
| 5,479,069 A | 12/1995 | Winsor | |
| 5,482,602 A | 1/1996 | Cooper et al. | |
| 5,491,028 A | 2/1996 | Sarin et al. | |
| 5,497,550 A | 3/1996 | Trotta et al. | |
| 5,509,841 A | 4/1996 | Winsor | |
| 5,516,729 A | 5/1996 | Dawson et al. | |
| 5,529,815 A | 6/1996 | Lemelson | |
| 5,531,878 A | 7/1996 | Vadgama et al. | |
| 5,541,566 A | 7/1996 | Deeney | |
| 5,547,716 A | 8/1996 | Thaler | |
| 5,551,959 A | 9/1996 | Martin et al. | |
| 5,552,675 A | 9/1996 | Lemelson | |
| 5,568,391 A | 10/1996 | McKee | |
| 5,593,719 A | 1/1997 | Dearnaley et al. | |
| 5,616,372 A | 4/1997 | Conley et al. | |
| 5,619,889 A | 4/1997 | Jones et al. | |
| 5,628,881 A | 5/1997 | Lemelson | |
| 5,630,275 A | 5/1997 | Wexler | |
| 5,630,953 A | 5/1997 | Klink | |
| 5,653,300 A | 8/1997 | Lund et al. | |
| 5,669,144 A | 9/1997 | Hahn et al. | |
| 5,672,054 A | 9/1997 | Cooper et al. | |
| 5,681,506 A * | 10/1997 | Pragnell et al. | 252/405 |
| 5,688,557 A | 11/1997 | Lemelson et al. | |
| 5,707,409 A | 1/1998 | Martin et al. | |
| 5,714,202 A | 2/1998 | Lemelson et al. | |
| 5,719,109 A | 2/1998 | Tokashiki et al. | |
| 5,723,207 A | 3/1998 | Lettington et al. | |
| 5,731,046 A | 3/1998 | Mistry et al. | |
| 5,735,769 A | 4/1998 | Takemura et al. | |
| 5,740,941 A | 4/1998 | Lemelson | |
| 5,775,817 A | 7/1998 | Gottemoller et al. | |
| 5,786,038 A | 7/1998 | Conley et al. | |
| 5,790,146 A | 8/1998 | Anderson et al. | |
| 5,793,390 A | 8/1998 | Claflin et al. | |
| 5,794,801 A | 8/1998 | Lemelson | |
| 5,799,549 A | 9/1998 | Decker et al. | |
| 5,806,557 A | 9/1998 | Helge | |
| 5,824,387 A | 10/1998 | Boutaghou et al. | |
| 5,834,708 A | 11/1998 | Svetal et al. | |
| 5,840,662 A | 11/1998 | Nibert et al. | |
| 5,843,571 A | 12/1998 | Sho | |
| 5,851,962 A | 12/1998 | Kaga | |
| 5,866,195 A | 2/1999 | Lemelson | |
| 5,871,805 A | 2/1999 | Lemelson | |
| 5,881,444 A | 3/1999 | Schaefer et al. | |
| 5,885,942 A | 3/1999 | Zhang et al. | |
| 5,901,021 A | 5/1999 | Hirano et al. | |
| 5,906,557 A | 5/1999 | Kobayashi | |
| 5,910,940 A | 6/1999 | Guerra | |
| 5,927,897 A | 7/1999 | Attar | |
| 5,937,812 A | 8/1999 | Reedy et al. | |
| 5,940,975 A | 8/1999 | Decker et al. | |
| 5,945,214 A | 8/1999 | Ma et al. | |
| 5,947,710 A | 9/1999 | Cooper et al. | |
| 5,952,102 A | 9/1999 | Cutler | |
| 5,958,261 A | 9/1999 | Offer et al. | |
| 5,960,762 A | 10/1999 | Imai | |
| 5,967,250 A | 10/1999 | Lund et al. | |
| 5,968,596 A | 10/1999 | Ma et al. | |
| 5,975,686 A | 11/1999 | Hauck et al. | |
| 5,976,707 A | 11/1999 | Grab | |
| 5,992,268 A | 11/1999 | Decker et al. | |
| 5,993,938 A | 11/1999 | Tsukuda et al. | |
| 6,006,415 A | 12/1999 | Schaefer et al. | |

| | | | | | | |
|---|---|---|---|---|---|---|
| 6,015,597 | A | 1/2000 | David | 6,544,308 | B2 | 4/2003 | Griffin et al. |
| 6,016,000 | A | 1/2000 | Moslehi | 6,553,957 | B1 | 4/2003 | Ishikawa et al. |
| 6,023,979 | A | 2/2000 | Bills et al. | 6,557,968 | B2 | 5/2003 | Lee et al. |
| 6,028,393 | A | 2/2000 | Izu et al. | 6,562,445 | B2 | 5/2003 | Iwamura |
| 6,051,298 | A | 4/2000 | Ko et al. | 6,562,462 | B2 | 5/2003 | Griffin et al. |
| 6,056,443 | A | 5/2000 | Koike et al. | 6,570,172 | B2 | 5/2003 | Kim et al. |
| 6,059,460 | A | 5/2000 | Ono et al. | 6,572,651 | B1 | 6/2003 | De Scheerder et al. |
| 6,059,830 | A | 5/2000 | Lippincott, III et al. | 6,572,935 | B1 | 6/2003 | He et al. |
| 6,071,597 | A | 6/2000 | Yang et al. | 6,572,937 | B2 | 6/2003 | Hakovirta et al. |
| 6,083,313 | A | 7/2000 | Venkatraman et al. | 6,585,064 | B2 | 7/2003 | Griffin et al. |
| 6,083,570 | A | 7/2000 | Lemelson et al. | 6,586,069 | B2 | 7/2003 | Dykes et al. |
| 6,095,690 | A | 8/2000 | Niegel et al. | 6,589,640 | B2 | 7/2003 | Griffin et al. |
| 6,099,541 | A | 8/2000 | Klopotek | 6,592,519 | B1 | 7/2003 | Martinez |
| 6,099,976 | A | 8/2000 | Lemelson et al. | 6,592,985 | B2 | 7/2003 | Griffin et al. |
| 6,106,919 | A | 8/2000 | Lee et al. | 6,601,662 | B2 | 8/2003 | Matthias et al. |
| 6,124,198 | A | 9/2000 | Moslehi | 6,626,949 | B1 | 9/2003 | Townley |
| 6,139,964 | A | 10/2000 | Sathrum et al. | 6,629,906 | B1 | 10/2003 | Chiba et al. |
| 6,142,481 | A | 11/2000 | Iwashita et al. | 6,637,528 | B2 | 10/2003 | Nishiyama et al. |
| 6,145,608 | A | 11/2000 | Lund et al. | 6,638,569 | B2 | 10/2003 | McLaughlin et al. |
| 6,156,439 | A | 12/2000 | Coffinberry | 6,645,354 | B1 | 11/2003 | Gorokhovsky |
| 6,159,558 | A | 12/2000 | Wolfe et al. | 6,655,845 | B1 * | 12/2003 | Pope et al. ............... 384/492 |
| 6,160,683 | A | 12/2000 | Boutaghou | 6,656,329 | B1 | 12/2003 | Ma et al. |
| 6,165,616 | A | 12/2000 | Lemelson et al. | 6,658,941 | B1 | 12/2003 | Bills et al. |
| 6,170,156 | B1 | 1/2001 | Lev et al. | 6,666,328 | B2 | 12/2003 | Sykora |
| 6,171,343 | B1 | 1/2001 | Dearnaley et al. | 6,666,671 | B1 | 12/2003 | Olver et al. |
| 6,173,913 | B1 | 1/2001 | Shafer et al. | 6,684,513 | B1 | 2/2004 | Clipstone et al. |
| 6,190,514 | B1 | 2/2001 | Ma et al. | 6,684,759 | B1 | 2/2004 | Gorokhovsky |
| 6,193,906 | B1 | 2/2001 | Kaneko et al. | 6,695,865 | B2 | 2/2004 | Boyle et al. |
| 6,197,120 | B1 | 3/2001 | David | 6,699,106 | B2 | 3/2004 | Myoung et al. |
| 6,197,428 | B1 | 3/2001 | Rogers | 6,701,627 | B2 | 3/2004 | Korb et al. |
| 6,200,675 | B1 * | 3/2001 | Neerinck et al. ............... 428/336 | 6,715,693 | B1 | 4/2004 | Dam et al. |
| 6,203,651 | B1 | 3/2001 | Jarvenkylae et al. | 6,726,993 | B2 | 4/2004 | Teer et al. |
| 6,205,291 | B1 | 3/2001 | Hughes et al. | 6,729,350 | B2 | 5/2004 | Schick |
| 6,207,625 | B1 | 3/2001 | Ogano et al. | 6,729,527 | B2 | 5/2004 | Sonnenreich et al. |
| 6,227,056 | B1 | 5/2001 | Bills et al. | 6,733,513 | B2 | 5/2004 | Boyle et al. |
| 6,237,441 | B1 | 5/2001 | Nishioka et al. | 6,739,214 | B2 | 5/2004 | Griffin et al. |
| 6,237,852 | B1 | 5/2001 | Svetal et al. | 6,739,238 | B2 | 5/2004 | Ushijima et al. |
| 6,238,839 | B1 | 5/2001 | Tomita et al. | 6,740,393 | B1 | 5/2004 | Massler et al. |
| 6,255,262 | B1 | 7/2001 | Keenan et al. | 6,745,742 | B2 | 6/2004 | Meyer |
| 6,261,424 | B1 | 7/2001 | Goncharenko et al. | 6,749,033 | B2 | 6/2004 | Griffin et al. |
| 6,273,793 | B1 | 8/2001 | Liners et al. | 6,753,042 | B1 | 6/2004 | Bakounine et al. |
| 6,274,220 | B1 | 8/2001 | Tsukuda et al. | 6,753,635 | B2 | 6/2004 | Kuhlmann-Wilsdorf |
| 6,289,593 | B1 | 9/2001 | Decker et al. | 6,761,532 | B2 | 7/2004 | Capone et al. |
| 6,293,648 | B1 | 9/2001 | Anderson | 6,761,736 | B2 | 7/2004 | Woo et al. |
| 6,296,552 | B1 | 10/2001 | Boutaghou et al. | 6,780,177 | B2 | 8/2004 | Shafirstein et al. |
| 6,299,425 | B1 | 10/2001 | Hirano et al. | 6,797,326 | B2 | 9/2004 | Griffin et al. |
| 6,305,416 | B1 | 10/2001 | Snel et al. | 6,799,468 | B2 | 10/2004 | Borenstein |
| 6,309,283 | B1 | 10/2001 | Liners et al. | 6,806,242 | B2 * | 10/2004 | Shirahama et al. ............ 508/291 |
| 6,311,524 | B1 | 11/2001 | Brennan, III et al. | 6,818,029 | B2 | 11/2004 | Myoung et al. |
| 6,316,734 | B1 | 11/2001 | Yang | 6,820,676 | B2 | 11/2004 | Palmaz et al. |
| 6,322,431 | B1 | 11/2001 | Schaenzer et al. | 6,821,189 | B1 | 11/2004 | Coad et al. |
| 6,322,719 | B2 | 11/2001 | Kaneko et al. | 6,821,624 | B2 | 11/2004 | Utsumi et al. |
| 6,324,060 | B1 | 11/2001 | Hsu | 6,822,788 | B2 | 11/2004 | Blitstein |
| 6,325,385 | B1 | 12/2001 | Iwashita et al. | 6,844,068 | B1 | 1/2005 | Miyake et al. |
| 6,329,328 | B1 | 12/2001 | Koganei et al. | 6,849,085 | B2 | 2/2005 | Marton |
| 6,333,298 | B1 | 12/2001 | Waddoups et al. | 6,855,237 | B2 | 2/2005 | Kolpakov et al. |
| 6,338,881 | B1 | 1/2002 | Sellschopp et al. | 6,855,791 | B2 | 2/2005 | Van Doren et al. |
| 6,340,245 | B1 | 1/2002 | Horton et al. | 6,861,098 | B2 | 3/2005 | Griffin et al. |
| 6,358,123 | B1 | 3/2002 | Liners et al. | 6,861,137 | B2 | 3/2005 | Hughes et al. |
| 6,367,705 | B1 | 4/2002 | Lee et al. | 6,865,952 | B2 | 3/2005 | Bills et al. |
| 6,368,676 | B1 | 4/2002 | Gaudreau et al. | 6,866,894 | B2 | 3/2005 | Trankiem et al. |
| 6,377,422 | B1 | 4/2002 | Boutaghou et al. | 6,871,700 | B2 | 3/2005 | Gorokhovsky |
| 6,379,383 | B1 | 4/2002 | Palmaz et al. | 6,872,203 | B2 | 3/2005 | Shafirstein et al. |
| 6,385,987 | B2 | 5/2002 | Schlom et al. | 6,878,447 | B2 | 4/2005 | Griffin et al. |
| 6,386,468 | B1 | 5/2002 | Neuberger et al. | 6,880,469 | B2 | 4/2005 | Frost |
| 6,399,215 | B1 | 6/2002 | Zhu et al. | 6,882,094 | B2 | 4/2005 | Dimitrijevic et al. |
| 6,401,058 | B1 | 6/2002 | Akalin et al. | 6,883,476 | B1 | 4/2005 | Nohara et al. |
| 6,439,845 | B1 | 8/2002 | Veres | 6,886,521 | B2 | 5/2005 | Hamada et al. |
| 6,439,986 | B1 | 8/2002 | Myoung et al. | 6,887,585 | B2 | 5/2005 | Herbst-Dederichs |
| 6,452,752 | B1 | 9/2002 | Boutaghou | 6,890,700 | B2 | 5/2005 | Tomita et al. |
| 6,468,642 | B1 | 10/2002 | Bray et al. | 6,893,720 | B1 | 5/2005 | Nakahigashi et al. |
| 6,471,979 | B2 | 10/2002 | New et al. | 6,969,198 | B2 * | 11/2005 | Konishi et al. .................. 384/13 |
| 6,494,881 | B1 | 12/2002 | Bales et al. | 7,067,175 | B2 * | 6/2006 | Veerasamy ................ 427/249.7 |
| 6,523,456 | B1 | 2/2003 | Kobayashi et al. | 7,086,362 | B2 | 8/2006 | Mabuchi et al. |
| 6,524,212 | B2 | 2/2003 | Ushijima et al. | 2001/0036800 | A1 | 11/2001 | Liners et al. |
| 6,534,141 | B1 | 3/2003 | Hull, Jr. et al. | 2002/0026899 | A1 | 3/2002 | McLaughlin et al. |
| 6,537,310 | B1 | 3/2003 | Palmaz et al. | 2002/0031987 | A1 | 3/2002 | Liners et al. |
| 6,537,429 | B2 | 3/2003 | O'Donnell et al. | 2002/0034631 | A1 | 3/2002 | Griffin et al. |
| 6,543,394 | B2 | 4/2003 | Tinney | 2002/0034632 | A1 | 3/2002 | Griffin et al. |

| | | | |
|---|---|---|---|
| 2002/0051286 A1 | 5/2002 | Blitstein | |
| 2002/0070357 A1 | 6/2002 | Kim et al. | |
| 2002/0074168 A1 | 6/2002 | Matthias et al. | |
| 2002/0089571 A1 | 7/2002 | Lee et al. | |
| 2002/0090155 A1 | 7/2002 | Ushijima et al. | |
| 2002/0090578 A1 | 7/2002 | Schaefera et al. | |
| 2002/0130219 A1 | 9/2002 | Parseghian et al. | |
| 2002/0148430 A1 | 10/2002 | Kano et al. | |
| 2002/0155015 A1 | 10/2002 | Esumi et al. | |
| 2002/0175476 A1 | 11/2002 | Chinou et al. | |
| 2003/0012234 A1 | 1/2003 | Watson et al. | |
| 2003/0019111 A1 | 1/2003 | Korb et al. | |
| 2003/0019332 A1 | 1/2003 | Korb et al. | |
| 2003/0021995 A1 | 1/2003 | Griffin et al. | |
| 2003/0034182 A1 | 2/2003 | Griffin et al. | |
| 2003/0035957 A1 | 2/2003 | Griffin et al. | |
| 2003/0035958 A1 | 2/2003 | Griffin et al. | |
| 2003/0036341 A1 | 2/2003 | Myoung et al. | |
| 2003/0037640 A1 | 2/2003 | Griffin et al. | |
| 2003/0069632 A1 | 4/2003 | De Scheerder et al. | |
| 2003/0108777 A1 | 6/2003 | Gunsel et al. | |
| 2003/0114094 A1 | 6/2003 | Myoung et al. | |
| 2003/0128903 A1 | 7/2003 | Yasuda et al. | |
| 2003/0159919 A1 | 8/2003 | Fairbairn et al. | |
| 2003/0162671 A1 | 8/2003 | Kalota et al. | |
| 2003/0162672 A1 | 8/2003 | Shirahama et al. | |
| 2003/0168323 A1 | 9/2003 | Frost | |
| 2003/0180565 A1 | 9/2003 | Herbst-Dederichs | |
| 2003/0199741 A1 | 10/2003 | Martinez | |
| 2003/0234371 A1 | 12/2003 | Ziegler | |
| 2003/0235691 A1 | 12/2003 | Griffin et al. | |
| 2004/0003638 A1 | 1/2004 | Schaefer et al. | |
| 2004/0008406 A1 | 1/2004 | Blitstein | |
| 2004/0010068 A1 | 1/2004 | Doren et al. | |
| 2004/0011900 A1 | 1/2004 | Gebhardt et al. | |
| 2004/0027018 A1 | 2/2004 | LeBlanc et al. | |
| 2004/0035375 A1 | 2/2004 | Gibisch et al. | |
| 2004/0074467 A1 | 4/2004 | Hamada et al. | |
| 2004/0092405 A1 | 5/2004 | Konishi et al. | |
| 2004/0105806 A1 | 6/2004 | Griffin et al. | |
| 2004/0109621 A1 | 6/2004 | Frost | |
| 2004/0115435 A1 | 6/2004 | Griffin et al. | |
| 2004/0133301 A1 | 7/2004 | Van Doren et al. | |
| 2004/0154570 A1 | 8/2004 | Mabuchi et al. | |
| 2004/0168326 A1 | 9/2004 | Korb et al. | |
| 2004/0171500 A1 | 9/2004 | Morita | |
| 2004/0184687 A1 | 9/2004 | Morales et al. | |
| 2004/0223256 A1 | 11/2004 | Feng et al. | |
| 2004/0234770 A1 | 11/2004 | Mori et al. | |
| 2004/0241448 A1 | 12/2004 | Kano et al. | |
| 2004/0242435 A1 | 12/2004 | Nishimura et al. | |
| 2004/0244539 A1 | 12/2004 | Korb et al. | |
| 2004/0261614 A1 | 12/2004 | Hamada et al. | |
| 2005/0001201 A1 | 1/2005 | Bocko et al. | |
| 2005/0005892 A1 | 1/2005 | Nishimura et al. | |
| 2005/0025975 A1 | 2/2005 | Okamoto et al. | |
| 2005/0035222 A1 | 2/2005 | Hamada et al. | |
| 2005/0037879 A1 | 2/2005 | Murata et al. | |
| 2005/0056241 A1 | 3/2005 | Nomura et al. | |
| 2005/0061291 A1 | 3/2005 | Nishimura et al. | |
| 2005/0061636 A1 | 3/2005 | Frost et al. | |
| 2005/0064196 A1 | 3/2005 | Martin et al. | |
| 2005/0082139 A1 | 4/2005 | Ishikawa et al. | |
| 2005/0084390 A1 | 4/2005 | Ueno et al. | |
| 2005/0089685 A1 | 4/2005 | Hamada et al. | |
| 2005/0098134 A1 | 5/2005 | Nishimura et al. | |
| 2005/0100701 A1 | 5/2005 | Hamada et al. | |
| 2005/0115744 A1 | 6/2005 | Griffin et al. | |
| 2005/0188942 A1 | 9/2005 | Hamada et al. | |

FOREIGN PATENT DOCUMENTS

| | | |
|---|---|---|
| DE | 6 43 034 | 3/1937 |
| DE | 195 07 086 A1 | 9/1996 |
| DE | 195 07 086 C2 | 9/1996 |
| DE | 197 04 224 A1 | 8/1997 |
| DE | 198 25 860 A1 | 12/1999 |
| DE | 100 17 459 A1 | 10/2000 |
| DE | 100 61 397 A1 | 5/2002 |
| DE | 101 58 683 A1 | 6/2003 |
| DE | 103 18 135 A1 | 11/2003 |
| DE | 103 37 559 A1 | 3/2005 |
| EP | 0 286 996 A3 | 10/1988 |
| EP | 0 299 785 A2 | 1/1989 |
| EP | 0 308 143 A1 | 3/1989 |
| EP | 0 333 416 A1 | 9/1989 |
| EP | 0 384 772 A1 | 8/1990 |
| EP | 0 388 800 A2 | 9/1990 |
| EP | 0 391 125 B1 | 10/1990 |
| EP | 0 392 125 A1 | 10/1990 |
| EP | 0 398 985 B1 | 11/1990 |
| EP | 0 407 977 A1 | 1/1991 |
| EP | 0 435 312 A1 | 7/1991 |
| EP | 0 291 006 B1 | 1/1992 |
| EP | 0 474 369 A1 | 3/1992 |
| EP | 0 500 253 A1 | 8/1992 |
| EP | 0 511 153 A1 | 10/1992 |
| EP | 0 529 327 A1 | 3/1993 |
| EP | 0 546 824 A1 | 6/1993 |
| EP | 0 308 143 B1 | 11/1993 |
| EP | 0 573 943 A1 | 12/1993 |
| EP | 0 619 504 A1 | 10/1994 |
| EP | 0 621 136 A2 | 10/1994 |
| EP | 0 624 353 A3 | 11/1994 |
| EP | 0 624 354 A3 | 11/1994 |
| EP | 0 378 378 B1 | 1/1995 |
| EP | 0 651 069 A1 | 5/1995 |
| EP | 0 651 069 B1 | 5/1995 |
| EP | 0 652 301 A1 | 5/1995 |
| EP | 0 661 470 A2 | 7/1995 |
| EP | 0 652 301 B1 | 10/1995 |
| EP | 0 677 570 A1 | 10/1995 |
| EP | 0 396 603 B1 | 6/1996 |
| EP | 0 388 800 B1 | 12/1996 |
| EP | 0 757 615 B1 | 2/1997 |
| EP | 0 759 519 A2 | 2/1997 |
| EP | 0 474 369 B1 | 3/1997 |
| EP | 0 818 622 A1 | 1/1998 |
| EP | 0 826 790 A1 | 3/1998 |
| EP | 0 826 790 B1 | 3/1998 |
| EP | 0 842 754 A1 | 5/1998 |
| EP | 0 850 133 B1 | 7/1998 |
| EP | 0 816 112 A3 | 10/1998 |
| EP | 0 870 820 A1 | 10/1998 |
| EP | 0 882 759 B1 | 12/1998 |
| EP | 0 624 353 B1 | 2/1999 |
| EP | 0 656 458 B1 | 2/1999 |
| EP | 0 647 318 B1 | 3/1999 |
| EP | 0 905 221 A1 | 3/1999 |
| EP | 0 905 419 A2 | 3/1999 |
| EP | 0 731 190 B1 | 5/1999 |
| EP | 0 949 200 A1 | 10/1999 |
| EP | 0 950 123 B1 | 10/1999 |
| EP | 0 845 154 B1 | 11/1999 |
| EP | 0 624 354 B1 | 12/1999 |
| EP | 0 582 676 B1 | 3/2000 |
| EP | 1 063 085 A1 | 12/2000 |
| EP | 0 850 126 B1 | 1/2001 |
| EP | 1 067 211 A1 | 1/2001 |
| EP | 1 076 087 A1 | 2/2001 |
| EP | 1 078 736 A1 | 2/2001 |
| EP | 1 087 008 A1 | 3/2001 |
| EP | 1 109 196 A1 | 6/2001 |
| EP | 0 778 902 B1 | 9/2001 |
| EP | 1 154 012 A2 | 11/2001 |
| EP | 1 034 320 B1 | 12/2001 |
| EP | 0 893 677 B1 | 1/2002 |
| EP | 1 183 470 B1 | 3/2002 |
| EP | 1 184 480 A2 | 3/2002 |
| EP | 1 190 791 A3 | 4/2002 |
| EP | 1 219 464 A2 | 7/2002 |
| EP | 1 233 054 A1 | 8/2002 |
| EP | 0 971 812 B1 | 10/2002 |
| EP | 1 018 291 B1 | 10/2002 |
| EP | 1 281 513 A2 | 2/2003 |
| EP | 1 300 608 A2 | 4/2003 |
| EP | 0 882 759 B1 | 6/2003 |
| EP | 1 498 597 A1 | 7/2003 |
| EP | 1 340 605 A1 | 9/2003 |

| | | | | | | |
|---|---|---|---|---|---|---|
| EP | 1 365 141 A1 | 11/2003 | | JP | 2003-013799 A | 1/2003 |
| EP | 1 083 946 B1 | 12/2003 | | JP | 2003-025117 A | 1/2003 |
| EP | 1 078 736 B1 | 1/2004 | | JP | 2003-028174 A | 1/2003 |
| EP | 1 378 271 A1 | 1/2004 | | JP | 2003-505533 A | 2/2003 |
| EP | 0 842 754 B1 | 3/2004 | | JP | 2003-082377 A | 3/2003 |
| EP | 0 862 395 B1 | 4/2004 | | JP | 2003-083342 A | 3/2003 |
| EP | 1 411 145 A1 | 4/2004 | | JP | 2003-088939 A | 3/2003 |
| EP | 1 418 353 A2 | 5/2004 | | JP | 2003-113941 A | 4/2003 |
| EP | 1 440 775 A1 | 7/2004 | | JP | 2003-147508 A | 5/2003 |
| EP | 1 445 119 A1 | 8/2004 | | JP | 2003-238982 A | 8/2003 |
| EP | 1 475 557 A1 | 11/2004 | | JP | 2004-036788 A | 2/2004 |
| EP | 1 481 699 A1 | 12/2004 | | JP | 2004-155891 A | 6/2004 |
| EP | 1 482 190 A2 | 12/2004 | | JP | 2004-155891 A | 6/2004 |
| EP | 1 311 885 B1 | 3/2005 | | JP | 2005-068529 A | 3/2005 |
| EP | 1 510 594 A2 | 3/2005 | | RU | 1770350 A1 | 10/1992 |
| EP | 1 512 781 A2 | 3/2005 | | RU | 2004586 C1 | 12/1993 |
| EP | 1 338 641 B1 | 5/2006 | | RU | 2153782 C1 | 7/2000 |
| FR | 2669689 A1 | 5/1992 | | WO | WO-89/06338 A1 | 7/1989 |
| GB | 0 768 226 | 2/1957 | | WO | WO-89/06707 A1 | 7/1989 |
| GB | 1 005 638 | 9/1965 | | WO | WO-89/06708 A1 | 7/1989 |
| GB | 2 338 716 A | 12/1999 | | WO | WO 92/02602 A1 | 2/1992 |
| IE | 990532 A1 | 3/2001 | | WO | WO-92/06843 A1 | 4/1992 |
| JP | 52-006318 | 1/1977 | | WO | WO-92/19425 A2 | 11/1992 |
| JP | 62-111106 A | 5/1987 | | WO | WO-93/21288 A1 | 10/1993 |
| JP | 63-021209 A | 1/1988 | | WO | WO 93/21289 A1 | 10/1993 |
| JP | 63-288994 A | 11/1988 | | WO | WO-93/24828 A1 | 12/1993 |
| JP | 05-070879 A | 3/1993 | | WO | WO-95/20253 A2 | 7/1995 |
| JP | 05-036004 U | 5/1993 | | WO | WO-95/29044 A1 | 11/1995 |
| JP | 05-042616 U | 6/1993 | | WO | WO-95/29273 A1 | 11/1995 |
| JP | 5-509125 A | 12/1993 | | WO | WO-95/31584 A1 | 11/1995 |
| JP | 6-200274 A | 7/1994 | | WO | WO-96/04485 A1 | 2/1996 |
| JP | 06-264993 A | 9/1994 | | WO | WO-96/05333 A1 | 2/1996 |
| JP | 6-294307 A | 10/1994 | | WO | WO-96/05942 A1 | 2/1996 |
| JP | 07-063135 A | 3/1995 | | WO | WO-96/06961 A1 | 3/1996 |
| JP | 7-090553 A | 4/1995 | | WO | WO-96/12389 A1 | 4/1996 |
| JP | 07-103238 A | 4/1995 | | WO | WO-96/24488 A1 | 8/1996 |
| JP | 07-118832 A | 5/1995 | | WO | WO-96/40446 A1 | 12/1996 |
| JP | 7-508049 A | 9/1995 | | WO | WO-97/07531 A1 | 2/1997 |
| JP | 07-041386 A | 10/1995 | | WO | WO-97/10093 A1 | 3/1997 |
| JP | 07-286696 A | 10/1995 | | WO | WO-97/10940 A1 | 3/1997 |
| JP | 08-014014 A | 1/1996 | | WO | WO-97/14555 A1 | 4/1997 |
| JP | 08-061499 A | 3/1996 | | WO | WO-97/16138 A1 | 5/1997 |
| JP | 08-128448 A | 5/1996 | | WO | WO-98/02715 A1 | 1/1998 |
| JP | 09-020981 A | 1/1997 | | WO | WO-98/12994 A1 | 4/1998 |
| JP | 09-253770 A | 9/1997 | | WO | WO-98/13528 A1 | 4/1998 |
| JP | 10-088369 A | 4/1998 | | WO | WO-98/47141 A1 | 10/1998 |
| JP | 2777750 B2 | 5/1998 | | WO | WO-99/09547 A1 | 2/1999 |
| JP | 10-166877 A | 6/1998 | | WO | WO-99/12404 A1 | 3/1999 |
| JP | 10-265790 A | 10/1998 | | WO | WO-99/14512 A1 | 3/1999 |
| JP | 10-298440 A | 11/1998 | | WO | WO-99/16371 A1 | 4/1999 |
| JP | 11-022423 A | 1/1999 | | WO | WO-99/22694 A2 | 5/1999 |
| JP | 11-181463 A | 7/1999 | | WO | WO-99/27157 A1 | 6/1999 |
| JP | 11-190406 A | 7/1999 | | WO | WO-99/29477 A1 | 6/1999 |
| JP | 11-287329 A | 10/1999 | | WO | WO-99/31557 A1 | 6/1999 |
| JP | 11-292629 A | 10/1999 | | WO | WO-99/34385 A1 | 7/1999 |
| JP | 11-294118 A | 10/1999 | | WO | WO-99/46847 A1 | 9/1999 |
| JP | 11-333773 A | 12/1999 | | WO | WO-99/54520 A1 | 10/1999 |
| JP | 2000-088104 A | 3/2000 | | WO | WO-99/54934 A1 | 10/1999 |
| JP | 2000-119843 A | 4/2000 | | WO | WO-99/57743 A1 | 11/1999 |
| JP | 2000-504089 A | 4/2000 | | WO | WO-99/62077 A1 | 12/1999 |
| JP | 2000-170768 A | 6/2000 | | WO | WO-99/62572 A1 | 12/1999 |
| JP | 2000-192951 A | 7/2000 | | WO | WO-00/22613 A1 | 4/2000 |
| JP | 2000-297373 A | 10/2000 | | WO | WO-00/24554 A1 | 5/2000 |
| JP | 2000-327484 A | 11/2000 | | WO | WO-00/25410 A1 | 5/2000 |
| JP | 2000-339083 A | 12/2000 | | WO | WO-00/28142 A1 | 5/2000 |
| JP | 2001-062605 A | 3/2001 | | WO | WO-00/33051 A1 | 6/2000 |
| JP | 2001-064005 A | 3/2001 | | WO | WO-00/35000 A1 | 6/2000 |
| JP | 2001-093141 A | 4/2001 | | WO | WO-00/44032 A1 | 7/2000 |
| JP | 2001-172766 A | 6/2001 | | WO | WO-00/47402 A1 | 8/2000 |
| JP | 2001-507724 A | 6/2001 | | WO | WO-00/55385 A1 | 9/2000 |
| JP | 2001-192864 A | 7/2001 | | WO | WO-00/56127 A1 | 9/2000 |
| JP | 2001-269938 A | 10/2001 | | WO | WO-00/56393 A1 | 9/2000 |
| JP | 2001-280236 A | 10/2001 | | WO | WO-00/62327 A2 | 10/2000 |
| JP | 2001-316686 A | 11/2001 | | WO | WO-00/68451 A2 | 11/2000 |
| JP | 2002-265968 A | 9/2002 | | WO | WO-00/75517-AI | 12/2000 |
| JP | 2002-309912 A | 10/2002 | | WO | WO-00/78504 A1 | 12/2000 |
| JP | 2002-332571 A | 11/2002 | | WO | WO-01/05917 A1 | 1/2001 |
| JP | 2002-357225 A | 12/2002 | | WO | WO-01/06033 A1 | 1/2001 |
| JP | 2003-013163 A | 1/2003 | | WO | WO-01/14736 A1 | 3/2001 |

| | | |
|---|---|---|
| WO | WO-01/14745 A1 | 3/2001 |
| WO | WO-01/26862 A1 | 4/2001 |
| WO | WO-01/37631 A2 | 5/2001 |
| WO | WO-01/40537 A1 | 6/2001 |
| WO | WO-01/47451 A1 | 7/2001 |
| WO | WO-01/59544 A2 | 8/2001 |
| WO | WO-01/61182 A1 | 8/2001 |
| WO | WO-01/61719 A1 | 8/2001 |
| WO | WO-01/62372 A1 | 8/2001 |
| WO | WO-01/63639 A1 | 8/2001 |
| WO | WO-01/67834 A1 | 9/2001 |
| WO | WO-01/79583 A2 | 10/2001 |
| WO | WO-01/80224 A2 | 10/2001 |
| WO | WO-02/13188 A1 | 2/2002 |
| WO | WO-02/24601 A1 | 3/2002 |
| WO | WO-02/24603 A1 | 3/2002 |
| WO | WO-02/24970 A2 | 3/2002 |
| WO | WO-02/32625 A2 | 4/2002 |
| WO | WO-02/44440 A1 | 6/2002 |
| WO | WO-02/054454 A2 | 7/2002 |
| WO | WO-02/062714 A2 | 8/2002 |
| WO | WO-02/073021 A1 | 9/2002 |
| WO | WO-02/080996 A1 | 10/2002 |
| WO | WO-02/085237 A2 | 10/2002 |
| WO | WO-02/090461 A1 | 11/2002 |
| WO | WO-02/097289 A1 | 12/2002 |
| WO | WO-03/009978 A1 | 2/2003 |
| WO | WO-03/013990 A1 | 2/2003 |
| WO | WO-03/020329 A1 | 3/2003 |
| WO | WO-03/021731 A1 | 3/2003 |
| WO | WO-03/031543 A2 | 4/2003 |
| WO | WO-03/046508 A3 | 6/2003 |
| WO | WO-03/054876 A1 | 7/2003 |
| WO | WO-03/076309 A2 | 9/2003 |
| WO | WO-03/078679 A1 | 9/2003 |
| WO | WO-03/091758 A2 | 11/2003 |
| WO | WO-03/095009 A1 | 11/2003 |
| WO | WO-03/105134 A1 | 12/2003 |
| WO | WO-2004/001804 A2 | 12/2003 |
| WO | WO-2004/004998 A1 | 1/2004 |
| WO | WO-2004/019809 A2 | 3/2004 |
| WO | WO-2004/024206 A1 | 3/2004 |
| WO | WO-2004/026359 A2 | 4/2004 |
| WO | WO-2004/026500 A2 | 4/2004 |
| WO | WO-2004/036169 A1 | 4/2004 |
| WO | WO-2004/036292 A2 | 4/2004 |
| WO | WO-2004/038701 A2 | 5/2004 |
| WO | WO-2004/043631 A1 | 5/2004 |
| WO | WO-2004/048126 A2 | 6/2004 |
| WO | WO-2004/067466 A1 | 8/2004 |
| WO | WO-2004/068530 A1 | 8/2004 |
| WO | WO-2004/071670 A1 | 8/2004 |
| WO | WO-2004/072959 A2 | 8/2004 |
| WO | WO-2004/078424 A2 | 9/2004 |
| WO | WO-2004/084773 A1 | 10/2004 |
| WO | WO-2004/088113 A1 | 10/2004 |
| WO | WO-2005/010596 A2 | 2/2005 |
| WO | WO-2005/011744 A2 | 2/2005 |
| WO | WO-2005/014760 A1 | 2/2005 |
| WO | WO-2005/014761 A2 | 2/2005 |
| WO | WO-2005/014763 A1 | 2/2005 |
| WO | WO-2005/014882 A1 | 2/2005 |
| WO | WO-2005/016620 A2 | 2/2005 |
| WO | WO-2005/021851 A1 | 3/2005 |
| WO | WO-2005/025844 A1 | 3/2005 |
| WO | WO-2005/034791 A1 | 4/2005 |
| WO | WO-2005/037144 A2 | 4/2005 |
| WO | WO-2005/037985 A2 | 4/2005 |
| WO | WO-2005/040451 A1 | 5/2005 |
| WO | WO-2005/042064 A1 | 5/2005 |
| WO | WO-2005/047737 A1 | 5/2005 |
| WO | WO-2006/075219 A2 | 7/2006 |
| WO | WO-2007/088649 | 8/2007 |

OTHER PUBLICATIONS

Kano et al., Proceedings of Japan Tribology Society, May 1999, pp. 11 and 12.
Kano et al., Proceedings of World Tribology Congress, Sep. 2001, p. 342.
International Standard, "Petroleum products—Determination of base number—Perchloric acid potentiometric titration method," ISO 3771, Aug. 15, 1994, pp. 1-8.
"Standard Test Method for Separation of Representative Aromatics and Nonaromatics Fractions of High-Boiling Oils by Elution Chromatography," ASTM Designation: D2549-91, 1995, pp. 895-900.
Japanese Industrial Standard, "High carbon chromium bearing steels," JIS G 4805, 1999, pp. 1-31.
Japanese Industrial Standard, "Chromium Molybdenum Steels," JIS G 4105, 1979, pp. 1-11.
Japanese Industrial Standard, "Chromium Steels," JIS G 4104, 1979, pp. 1-9.
Japanese Industrial Standard, "Aluminium alloy castings," JIS H 5202, 1999, pp. 1-17.
Japanese Industrial Standard, "Aluminium alloy die castings," JIS H 5302, 2000, pp. 1-12.
U.S. Appl. No. 10/911,741, filed May 5, 2004, Ueno.
"Aluminium Alloy Die Castings," JIS H5302, (2000), pp. 1670-1681.
"Aluminium Alloys Castings", Japanese Industrial Standard (JIS H 5202), 1999 (pp. 1637-1646).
"Assessment of 2nd to 5th Order Irregularities of Surface Configuration by Means of Sections of Surfaces Definitions Relating to Reference System and Dimensions," DIN 4762, UDC 621-288:001.4 (Aug. 1960), pp. 1-4.
"Carbon Steels for Machine Structural Use", Japanese Industrial Standard (JIS G 4051), 1979, pp. 1-10.
"Carbon Steels for Machine Structural Use", Japanese Industrial Standard (JIS G 4051), 1979, pp. 1381-1383.
"Geometrical Product Specifications (GPS)—Surface texture: Profile method—Terms, definitions and surface texture parameters", Japanese Industrial Standard (JIS B 0601) Machine Elements, 2003, pp. 6, 7, 263-287, and 2586.
"Geometrical Product Specifications (GPS)—Surface Texture: Profile Method—Terms, Definitions and Surface Texture Parameters," International Standard, ISO 4287, TC 213 (1997), pp. 1-25.
"Grey iron castings", Japanese Industrial Standard (JIS G 5501), pp. 2075-2077.
"Stainless Steel Bars", Japanese Industrial Standard (JIS G 4303), pp. 1457-1477.
"Standard Practice for Codification of Certain Nonferrous Metals and Alloys, Cast and Wrought1", ASTM International, Designation: B 275-02, Jun. 2002, pp. 1-7.
"Standard Test Method for Calibration and Operation of the Falex Block-on-Ring Friction and Wear Testing Machine", ASTM Designation: D2714-88, Jan. 1989, pp. 383-386.
Ajayi, O., et al., "Effect of Carbon Coating on Scuffing Performance in Diesel Fuels," Tribology Transactions, vol. 44, 2001, pp. 298-304.
Ajayi, O., et al., Effect of Thin-Film Coating on Wear in EGR-Contaminated Oil, Energy Technology Div., Argonne National Laboratory.
API Motor Oil Guide, Which Oil is Right for You, American Petroleum Institute, Copyright 2002.
D.G. Watson et al., "Engineering Drawing Practice," XP002281300, University of Hertfordshire, Sep. 1991, p. 29, Figure 38.
Dr. Marx, "Surfaces and Contact Mechanics", XP-002233233, Google, Retrieved from the Internet, Mar. 3, 2003, pp. 1-18.
Engine Oil Viscosity Classification—SAE J300 revised Apr. 1997, p. 133.
Fujimori, N., et al., "Characterization of Conducting Diamond Films," Vacuum, vol. 36, Nos. 1-3, 1996, pp. 99-102.
Gåhlin, Rickard et al., "ME-C:H Coatings in Motor Vehicles," Wear 249, 2001, pp. 302-309.
Hershberger, J, et al., "Friction and Wear Behavior of Near-Frictionless Carbon Coatings in Formulated Gasolines," Surface & Coating Technology, 183, 2004, pp. 111-117.
Hershberger, J., et al., "Evaluation of DLC Coatings for Spark-Ignited, Direct-Injected Fuel Systems," Surface & Coatings Technology, 179, 2004, pp. 237-244.
International Standard "Application of Carbides for Machining by Chip Removal—Designation of the Main Groups of Chip Removal and Groups of Application," ISO 513, (1975), pp. 67-69.
Japanese Industrial Standard "Aluminium Alloy Castings," JIS H5202, (1999), pp. 1-17.

Japanese Industrial Standard Handbook, "Machine Elements", 2003, pp. 262-286 and 2586.

Japanese Industrial Standard, "Structural Steels with Specified Hardenability Bands", JIS G 4052, 1979, pp. 2414, 2415, 1390-1403, 1410 and 1411.

JIS Japanese Industrial Standard; "Surface Roughness—Definitions and Designation"; JIS B 0601; 1994. (w/Translation).

JIS Japanese Industrial Standard; "Vickers Hardness Test—Test Method"; JIS Z 2244; 1998; (w/Translation).

K. Holmberg et al., "Tribological Characteristics of Diamond-like Carbon Coatings," VTT Symposium, Technical Research Centre of Finland, XP000570636, 1994, pp. 24-238.

Kano et al., "Friction Characteristics of a Hard Carbon Film in Engine Oil, (No. 2) (Surface Analysis Result of Sliding Surface)," Japan Tribology Congress 1999, 5, pp. 11-12.

Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Kovalchenko, A., et al., "Friction and Wear Performance of Low-Friction Carbon Coatings Under Oil Lubrication," Energy Technology Div., Argonne National Laboratory.

Patent/Literature Search Report, Bawa Biotechnology Consulting, LLC, Jun. 3, 2005 (201 pages).

Ronkainen, Helena, "Tribological Properties of Hydrogenated and Hydrogen-Free Diamond-Like Carbon Coatings," Disseration for the Degree of Doctor of Science in Technology, VTT Publications No. 434.

Steve J. Bull et al., "High-Performance Diamond and Diamond-like Coatings", JOM, Apr. 1995, pp. 16-19, vol. 47, No. 4, XP 000500980.

Korean Office Action mailing date of Dec. 15, 2006 for Korean Patent No. 2006-075182465.

Korean Office Action issued by Korean Patent Office dated Oct. 9, 2009 for Korean Patent Application No. 10-2007-7026787.

Kano, et al. "Ultralow friction of DLC in presence of glycerol mono-oleate (GMO)" Tribology Letters, Feb. 2005, vol. 18, No. 2, pp. 245-251.

* cited by examiner

LOW-FRICTION SLIDING MECHANISM, LOW-FRICTION AGENT COMPOSITION AND METHOD OF FRICTION REDUCTION

TECHNICAL FIELD

The present invention relates to; a low-friction sliding mechanism; a low-friction agent composition; a method of friction reduction; a manual transmission; and a final reduction gear unit. In more detail, the present invention relates to; a low-friction sliding mechanism that can improve the friction characteristics of various sliding surfaces in, for instance, internal combustion engines and drive system transmission units; a low-friction agent composition and a method of friction reduction; a manual transmission that is provided with a sliding section that is small in the friction coefficient and excellent in the seizure resistance and wear resistance and can exhibit excellent fuel cost over a long term; and a final reduction gear unit that can reduce the friction coefficient in a sliding section and improve the seizure resistance and the wear resistance and reduce the friction resistance to improve the fuel efficiency of an automobile.

BACKGROUND ART

Earth scale environment problems such as global warming and destruction of the ozone layer are largely highlighted. In particular, the $CO_2$ reduction that is said to largely affect on the warming of the earth as a whole is gathering attention on how to decide the regulation value in each country.

As to the $CO_2$ reduction, the reduction of the energy loss due to the friction loss of machines and devices, in particular, the reduction of the fuel cost of automobiles is a large problem. Accordingly, the roles of sliding materials and lubricants are very important in this connection.

A role of the sliding material is to be excellent in the wear resistance and develop excellent wear resistance to sections of which friction and wear environment are severe among the sliding sections of an engine. Recently, various kinds of hard thin film materials are being forwarded in applications. The friction coefficients of general DLC materials are lower in air and in the absence of lubricating oil than that of wear resistant hard coating materials such as TiN and CrN; accordingly, these are expected as low friction sliding materials.

Furthermore, as an energy saving measure in the lubricating oil, for instance, as a fuel efficiency measure of an engine, 1) reduction, caused by lowering the viscosity, of the viscous resistance in a hydrodynamic lubrication region and the agitation resistance in an engine and 2) reduction, owing to blending of an optimum friction modifier and various kinds of additives, of the friction loss under mixed lubrication and boundary lubrication region are proposed. Many researches have been conducted mainly of organic Mo compounds such as MoDTC and MoDTP as the friction modifier. In a sliding surface made of an existing steel material, a lubricating oil composition in which an organic Mo compound that exhibits the excellent low friction coefficient at an early stage of use is advantageously applied.

On the other hand, a general DLC material excellent in the low friction characteristics in air is reported to be, in the presence of the lubricating oil, low in the friction reduction effect (for instance, non-patent literature 1). Furthermore, it has been found that even when a lubricating oil composition containing an organic molybdenum compound is applied to the sliding material the friction reduction effect cannot be sufficiently exerted (for instance, non-patent literature 2).

Non-patent literature 1: Kano et al., *Proceedings of Japanese Tribology Society*, p. 11 to 12, May, 1999 (Tokyo)

Non-patent literature 2: Kano et al., *Proceeding of World Tribology Congress* September, 2001, p. 342, (Vienna)

Then, as to the fuel efficient technology of a manual transmission of an automobile, there is a proposal in which the agitation of lubricating oil by a power transfer is avoided or made very small to inhibit the power transmission efficiency from deteriorating owing to the agitation resistance (for instance, patent literature 1).

Patent literature 1: JP-A-10-166877

On the other hand, as to the lubricating oil that is used in such a transmission, a lubricating oil composition in which, to lubrication base oil a boron-containing ash-less dispersant, an alkaline-earth metal base detergent and a sulfur base additive are blended is proposed (patent literature 2). Furthermore, gear oil in which, to base oil that is low in a sulfur content and has predetermined viscosity, primary zinc dithiophosphate, an alkaline earth metal detergent, alkenyl succinic imide having a polybutenyl group having a predetermined molecular weight, a derivative thereof, phosphoric ester amine salt, and a sulfur compound are contained is proposed (patent literature 3).

Patent literature 2: JP-A-2003-82377

Patent literature 3: JP-A-11-181463

Furthermore, as to the fuel efficient technology of the final reduction gear unit of an automobile, with an intention of improving the transmission efficiency at a differential gear, a lubricating oil composition for use in the final reduction gear unit, which contains a phosphorus base extreme pressure agent selected from a specific range, organic acids having a specific structure and a sulfur base extreme pressure agent selected from a specific range in a lubrication base oil, is proposed (patent literature 4).

Patent literature 4: JP-A-6-200274

Still furthermore, in order to reduce the sliding friction loss between a roller end surface and an inner wheel large guard, a conical roller bearing where a cone center of an outer diameter surface of a conical roller is displaced from a center axis of the inner wheel and the application of such conical roller bearing to an automobile differential are proposed (patent literature 5).

Patent literature 5: JP-A-2000-192951

DISCLOSURE OF INVENTION

In the manual transmission described in patent literature 1, as described above, the reduction of the agitation resistance of the lubricating oil is studied. However, an improvement in the performance and fuel efficient due to the reduction of the friction of the sliding sections, in particular, the compatibility between a sliding member and the lubricating oil is not studied.

Furthermore, as to one that concerns lubricating oil alone, the lubricating oil is formed into a constitution as shown in examples of the patent literatures 2 and 3 to improve the wear inhibition, the fatigue life and the friction characteristics between a synchronizer ring and a gear cone. However, in the study, the characteristics of the sliding member are not particularly considered to reduce the friction coefficient.

Furthermore, in the lubricating oil composition for use in the final reduction gear unit, which is described in the patent literature 4, a prescription is studied to improve the transmission efficiency in the gear section. Still furthermore, in the patent literature 5, an improvement in a structure of the conical roller bearing is studied to reduce the friction loss. However, the reduction of the friction of the sliding surface itself and the compatibility between the sliding member and the lubricating oil are not studied.

The invention is achieved considering such problems that existing technologies have; and intends to provide a low-friction sliding mechanism, a low-friction agent composition and a friction reduction method that can exert very excellent low friction characteristics to a sliding surface present under various applications, and, in particular, that have more excellent low friction characteristics than that of a combination of the existing steel material and the organic Mo compound.

Furthermore, the invention intends to provide a manual transmission that can reduce the friction coefficient in various kinds of sliding sections in the manual transmission such as bearing sections to improve the seizure resistance and the wear resistance and to reduce the sliding resistance of the respective sections to contribute in improving the fuel efficiency of an automobile.

Still furthermore, the invention intends to provide a final reduction gear unit that can reduce the friction coefficient in various kinds of sliding sections in the final reduction gear unit such as a section between a back surface of a side gear that slidably comes into contact through a washer and an internal surface of a differential case to improve the seizure resistance and the wear resistance and to reduce the sliding resistance of the respective sections to contribute in improving the fuel efficiency of an automobile.

The inventors, after studying hard to overcome the above problems, found that a combination of sliding members at least one of which is a DLC material and a specific compound shows the friction characteristics very excellent to an extent that cannot be realized from an existing lubrication theory, and thereby come to completion of the invention.

Furthermore, the inventors found that, when one or both of sliding surfaces that slidingly contact each other are provided thereon with a hard carbon thin film less in hydrogen content, in the presence of a low-friction agent composition, the friction coefficient can be largely reduced. Furthermore, the inventors found that, in a sliding member covered with such a hard carbon thin film, in order to realize low friction coefficient and to improve the seizure resistance and the wear resistance, an additive used in the low-friction agent composition affects to no small extent. Thereby, the invention comes to completion.

In the low-friction sliding mechanism according to the invention, when in a sliding surface made of a DLC coated sliding member an oxygen-containing organic compound or an aliphatic amine compound is included, the friction characteristics more excellent than that of an existing combination of a sliding member and a low-friction agent composition can be obtained.

Furthermore, the manual transmission according to the invention reduces the friction coefficients in various kinds of sliding sections such as a bearing section, improves the seizure resistance and the wear resistance, and furthermore reduces the sliding resistance in various sections to contribute to improve the fuel efficiency of an automobile.

Still furthermore, the final reduction gear unit according to the invention reduces the friction coefficient between a back surface of a side gear and an inner surface of a differential case, improves the seizure resistance and the wear resistance, and furthermore reduces the sliding resistance in various sections to contribute to improve the fuel efficiency of an automobile.

BEST MODE FOR CARRYING OUT THE INVENTION

Figure 1:
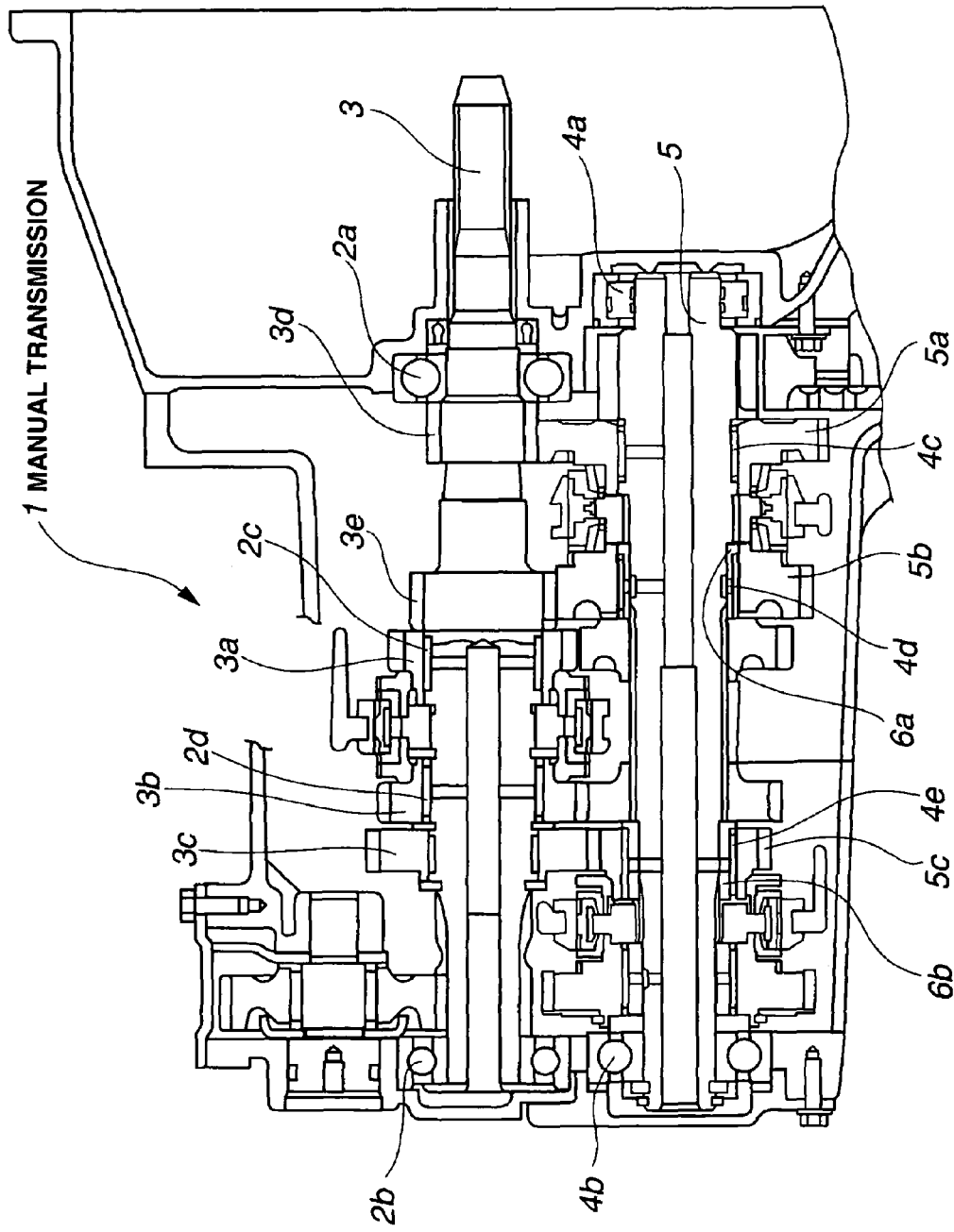
FIG. 1 is a sectional explanatory diagram exemplifying a sliding section covered with a hard carbon thin film in a manual transmission according to the invention.

In what follows, a low-friction sliding mechanism and a low-friction agent composition according to the invention will be more detailed. In the specification, "%" denotes a mass percentage unless otherwise stated.

Such a low-friction sliding mechanism is formed by including a low-friction agent composition between sliding surfaces that the sliding members form when a DLC coated sliding member (A) and a sliding member (B) are slid. As the low-friction agent composition, one that contains at least one kind selected from a group consisting of an oxygen-containing organic compound (C) and an aliphatic amine compound (D) is used. Thereby, the DLC coated sliding member and the sliding member slide each other at the extremely lower friction than ever.

Here, a DLC (Diamond-Like Carbon) material used in the DLC coated sliding member (A) is an amorphous mainly made of carbon element, and a bonding state between carbons is made of both of a diamond structure ($SP^3$ bond) and a graphite bond ($SP^2$ bond). Specifically, a-C (amorphous carbon) entirely made of carbon element, a-C: H (hydrogen amorphous carbon) containing hydrogen and MeC partially containing a metal element such as titanium (Ti) or molybdenum (Mo) can be cited. In the low-friction sliding mechanism according to the invention, from a viewpoint of expressing a large friction reduction effect, the DLC material is preferably made of an a-C material that does not contain hydrogen. Furthermore, in the DLC material, with an increase in the hydrogen content, the friction coefficient increases. Accordingly, the hydrogen content is preferably 20 atomic percent or less. Still furthermore, in order to sufficiently lower the friction coefficient during sliding in the low friction agent composition and to secure more stable sliding characteristics, the hydrogen content is desirably 10 atomic percent or less, more desirably atomic percent or less and still more desirably 0.5 atomic percent or less. The DLC material with such a low hydrogen content can be obtained by depositing by use of a PVD method that substantially does not use hydrogen or a hydrogen-containing compound such as a sputtering method or an ion plating method.

In this case, in order to reduce an amount of hydrogen in a film, it is desirable not only to use a gas that does not contain hydrogen during the deposition but also, as needs arise, to bake a reaction vessel and a base material holder and to thoroughly cleanse a surface of the base material before deposition.

Furthermore, as a base material that is used in the DLC coated sliding member (A), for instance, carburized steel, hardened steel and non-ferrous metals such as aluminum can be used.

As to the surface roughness of the base material before DLC coating, since a film thickness of a hard carbon thin film is rather thin and the surface roughness of a deposited film is largely affected, the surface roughness Ra (center line average roughness) is preferably 0.1 μm or less. That is, when the surface roughness Ra of the base material is such coarse as to exceed 0.1 μm, since projections caused from the roughness of the film surface increase local contact pressure with a counterpart, the likelihood of inducing cracking of the film becomes higher.

Furthermore, a constituent material of the sliding member (B) is not particularly restricted. Specifically, metal materials such as ferrous materials, aluminum base materials, magnesium base materials and titanium base materials can be cited. In particular, the ferrous materials, aluminum base materials and magnesium base materials, being readily applicable to sliding sections of existing machines and devices and able to widely contribute to an energy saving measure in various fields, are preferable.

Still furthermore, as the constituent materials of the sliding member (B), non-metal materials such as resins, plastics and carbon can be used as well.

Furthermore, materials obtained by applying various kinds of thin film coating on the metal materials and non-metal materials are useful as well.

The ferrous materials are not particularly restricted. Not only high purity iron, but also various kinds of ferrous alloys (nickel, copper, zinc, chromium, cobalt, molybdenum, lead, silicon or titanium, and ones obtained by arbitrarily combining these) can be used. Specifically, for instance, carburized steel SCM420 or SCr420 (JIS) can be cited.

Furthermore, the aluminum base materials are not particularly restricted. Not only high purity aluminum but also various kinds of aluminum base alloys can be used. Specifically, for instance, a hypoeutectic aluminum alloy containing 4 to 20% silicon (Si) and 1.0 to 5.0% copper or a hypereutectic aluminum alloy can be desirably used. As preferable example of the aluminum alloy, for instance, AC2A, AC8A, ADC12 and ADC14 (JIS) can be cited.

Among the sliding members (B), the metal materials provided with various kinds of coating are not particularly restricted. Specifically, various kinds of metal materials such as metal base materials obtained by applying a thin film of TiN, CrN or the DLC material on a surface of the ferrous materials, aluminum base materials, magnesium base materials or titanium base materials can be cited. Among these, the metal material coated with the DLC material is preferable. Furthermore, the DLC material is preferably the a-C diamond-like carbon that does not contain hydrogen.

Furthermore, from the sliding stability, the surface roughness Ra of each of the DLC coated sliding member (A) and the sliding member (B) (for instance, metal materials or the metal materials coated with various kinds of thin film) is 0.1 μm or less and preferably 0.08 μm or less. When it exceeds 0.1 μm, local scaffing is caused to result in a large increase in the friction coefficient in some cases.

Still furthermore, in the DLC coated sliding member (A), it is preferable that the surface hardness thereof is in the range of Hv1000 to 3500 in the micro-Vickers hardness (10 g load) and a DLC film thickness is in the range of 0.3 to 2.0 μm. When the surface hardness and the thickness of the DLC coated sliding member (A) are outside of the above-mentioned ranges to be less than Hv1000 in the surface hardness and less than 0.3 μm in the thickness, the DLC coated sliding member becomes easily worn, by contrast, when they exceed Hv3500 and 2.0 μm, respectively, it becomes easily peeled, and, when the surface hardness of the ferrous member is outside thereof to be less than HRC45, under high pressure, in some cases, it becomes easier to buckle and peel.

In the case of a ferrous material being used in the sliding member (B), the surface hardness thereof is preferably in the range of HRC45 to 60 in Rockwell hardness C-scale. In this case, even under a high surface pressure sliding condition such as substantially 700 MPa like in a cam follower member, the durability of the film can be effectively maintained.

Furthermore, in the case of an aluminum base material being used in the sliding member (B), the surface hardness thereof is preferably in the range of $H_B80$ to 130 in Brinell hardness. When the surface hardness of the aluminum base material is outside of the above range to be less than $H_B80$, the aluminum base material becomes easily worn.

Still furthermore, in the case of a thin film-coated metal material being used in the sliding member (B), in particular, in the case of the DLC-coated metal material being used, it is preferable that the surface hardness thereof is in the range of Hv1000 to 3500 in the micro-Vickers hardness (10 g load) and a DLC film thickness is in the range of 0.3 to 2.0 μm. When the surface hardness and the thickness thereof are outside of the above-mentioned ranges to be less than Hv1000 in the surface hardness and less than 0.3 μm in the thickness, the abrasion is easily caused, by contrast, when they exceed Hv3500 and 2.0 μm, in some cases, peeling is easily caused.

Sliding surfaces made of the DLC coated sliding member (A) and the sliding member (B), as long as these are sliding surfaces where two sliding surfaces come into contact through a low-friction agent composition, can be used without particular restrictions. For instance, sliding sections of internal combustion engines such as 4-cycle engines and 2-cycle engines (for instance, a valve operating system, a piston, a piston ring, a piston skirt, a cylinder liner, a con-rod, a crank shaft, a bearing, a roller bearing, metal, a gear, a chain, a belt, an oil pump and the like), sliding sections of a driving system transmission mechanism (for instance, gear) and a hard disc drive, and other various sliding surfaces where the friction conditions are severe and the low friction properties are demanded are targeted. In the sliding surfaces, when only at least one of the sliding members is DLC-coated and at least one kind selected from the oxygen-containing organic compound and aliphatic amine compound is supplied, more than ever lubricant and extremely excellent low friction characteristics can be effectively obtained.

For instance, as preferable embodiments in a valve operating system of an internal combustion engine, sliding surfaces made of a disc-like shim and a lifter crown surface where the DLC is coated on a substrate of a steel material and a cam lobe that uses a material involving low-alloy chilled iron, carburized steel or tempered carbon steel, and arbitrary combinations thereof can be cited.

On the other hand, the aforementioned oxygen-containing organic compound (C) in the low-friction sliding mechanism of the invention is not particularly restricted and can be any organic compound containing oxygen in the molecule. For example, it may be an oxygen-containing organic compound constituted of carbon, hydrogen and oxygen. The oxygen-containing organic compound may contain another element such as nitrogen, sulfur, halogen (fluorine, chlorine etc.), phosphorus, boron, a metal, or the like. Particularly in view of further reducing the friction in the sliding surfaces of one sliding member (DLC coated sliding member) (A) and the other sliding member (B), there is preferred an oxygen-containing organic compound constituted of carbon, hydrogen and oxygen and containing a hydroxyl group, or a derivative thereof, in which it is more preferred that two or more hydroxyl groups are contained. Also for the same reason, there is more preferred an oxygen-containing organic compound with a low sulfur content or free from sulfur.

Also a "derivative" used herein is not particularly restricted and can be, for example, a compound obtained by reacting an oxygen-containing organic compound constituted of carbon, hydrogen and oxygen with a nitrogen-containing compound, a phosphorus-containing compound, sulfur or a sulfur-containing compound, a boron-containing compound, a halogen element or a halogen-containing compound, a metal element, a metal-containing compound (organic or inorganic), or the like.

The aforementioned oxygen-containing organic compound (C) can specifically be a compound containing a hydroxyl group, a carboxyl group, a carbonyl group, an ester bond or an ether bond (two or more kinds of such group or bond may also be contained), preferably contains one or more kinds of group or bond selected from a hydroxyl group, a carboxyl group, a carbonyl group, and an ester bond, more preferably is an oxygen-containing organic compound containing one or more kinds of group or bond selected from a hydroxyl group, a carboxyl group and an ester group, further preferably is an oxygen-containing organic compound containing one or more kinds of group selected from a hydroxyl group and a carboxyl group, and particularly preferably an oxygen-containing organic compound containing one or more hydroxyl groups.

More specific examples of the oxygen-containing organic compound include alcohols (I), carboxylic acids (II), esters (III), ethers (IV), ketones (V), aldehydes (VI), carbonates (these compounds may further contain one or more kinds of group or bond selected from a hydroxyl group, a carboxyl group, a carbonyl group, an ester bond and an ether bond) (VII), derivatives thereof and an arbitrary mixture thereof.

The above-mentioned alcohols (I) are oxygen-containing organic compounds represented by the following general formula (1):

R—(OH)$_n$               (1)

, for example, a compound containing one or more hydroxyl groups.

Examples of alcohols (I) are mentioned below:
Monoalcohols (I-1);
Dialcohols (I-2);
Tri and higher polyalcohols (I-3); and
Mixtures of one or more selected from the above three kinds of alcohols (I-4).

Monoalcohols (I-1) have one hydroxyl group in the molecule, including, for example, monohydric alkyl alcohols having from 1 to 40 carbon atoms (in which the alkyl group may be linear or branched) such as methanol, ethanol, propanol (1-propanol, 2-propanol), butanol (1-butanol, 2-butanol, 2-methyl-1-propanol, 2-methyl-2-propanol), pentanol (1-pentanol, 2-pentanol, 3-pentanol, 2-methyl-1-butanol, 3-methyl-1-butanol, 3-methyl-2-butanol, 2-methyl-2-butanol, 2,2-dimethyl-1-propanol), hexanol (1-hexanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2,3-dimethyl-1-butanol, 2,3-dimethyl-2-butanol, 3,3-dimethyl-1-butanol, 3,3-dimethyl-2-butanol, 2-ethyl-1-butanol, 2,2-dimethylbutanol), heptanol (1-heptanol, 2-heptanol, 3-heptanol, 2-methyl-1-hexanol, 2-methyl-2-hexanol, 2-methyl-3-hexanol, 5-methyl-2-hexanol, 3-ethyl-3-pentanol, 2,2-dimethyl-3-pentanol, 2,3-dimethyl-3-pentanol, 2,4-dimethyl-3-pentanol, 4,4-dimethyl-2-pentanol, 3-methyl-1-hexanol, 4-methyl-1-hexanol, 5-methyl-1-hexanol, 2-ethylpentanol), octanol (1-octanol, 2-octanol, 3-octanol, 4-methyl-3-heptanol, 6-methyl-2-heptanol, 2-ethyl-1-hexanol, 2-propyl-1-pentanol, 2,4,4-trimethyl-1-pentanol, 3,5-dimethyl-1-hexanol, 2-methyl-1-heptanol, 2,2-dimethyl-1-hexanol), nonanol (1-nonanol, 2-nonanol, 3,5,5-trimethyl-1-hexanol, 2,6-dimethyl-4-heptanol, 3-ethyl-2,2-dimethyl-3-pentanol, 5-methyloctanol, etc.), decanol (1-decanol, 2-decanol, 4-decanol, 3,7-dimethyl-1-octanol, 2,4,6-trimethylheptanol, etc.), undecanol, dodecanol, tridecanol, tetradecanol, pentadecanol, hexadecanol, heptadecanol, octadecanol (stearyl alcohol, etc.), nonadecanol, eicosanol, heneicosanol, tricosanol, tetracosanol; monohydric alkenyl alcohols having from 2 to 40 carbon atoms (in which the alkenyl group may be linear or branched and the double bond may be in any desired position) such as ethenol, propenol, butenol, hexenol, octenol, decenol, dodecenol, octadecenol (oleyl alcohol, etc.); monohydric (alkyl)cycloalkyl alcohols having from 3 to 40 carbon atoms (in which the alkyl group may be linear or branched, and the alkyl group and the hydroxyl group may be in any desired position) such as cyclopentanol, cyclohexanol, cycloheptanol, cyclooctanol, methylcyclopentanol, methylcyclohexanol, dimethylcyclohexanol, ethylcyclohexanol, propylcyclohexanol, butylcyclohexanol, dimethylcyclohexanol, cyclopentylmethanol, cyclohexylethanol (1-cyclohexylethanol, 2-cyclohexylethanol, etc.), cyclohexylethanol, cyclohexylpropanol (3-cyclohexylpropanol, etc.), cyclohexylbutanol (4-cyclohexylbutanol, etc.) butylcyclohexanol, 3,3,5,5-tetramethylcyclohexanol; (alkyl)aryl alcohols (in which the alkyl group may be linear or branched, and the alkyl group and the hydroxyl group may be in any desired position) such as phenyl alcohol, methylphenyl alcohol (o-cresol, m-cresol, p-cresol), creosol, ethylphenyl alcohol, propylphenyl alcohol, butylphenyl alcohol, butylmethylphenyl alcohol (3-methyl-6-tert-butylphenyl alcohol, etc.), dimethylphenyl alcohol, diethylphenyl alcohol, dibutylphenyl alcohol (2,6-di-tert-butylphenyl alcohol, 2,4-di-tert-butylphenyl alcohol, etc.), dibutylmethylphenyl alcohol (2,6-di-tert-butyl-4-methylphenyl alcohol, etc.), dibutylethylphenyl alcohol (2,6-di-tert-butyl-4-ethylphenyl alcohol, etc.), tributylphenyl alcohol (2,4,6-tri-tert-butylphenyl alcohol, etc.), naphthol (α-naphthol, β-naphthol, etc.), dibutylnaphthol (2,4-di-tert-butyl-α-naphthol, etc.); 6-(4-hydroxy-3,5-di-tert-butylanilino)-2,4-bis(n-octylthio)-1,3,5-triazine, and their mixtures.

Of those, more preferred are linear or branched alkyl or alkenyl alcohols having from 12 to 18 carbon atoms such as oleyl alcohol and stearyl alcohol, in that they may more effectively lower the friction of the sliding surfaces formed of the DLC coated sliding member (A) and any other sliding member (B) and that they are poorly volatile and therefore may exhibit their friction-reducing effect even at high temperature conditions (for example, sliding condition in an internal combustion engine).

Dialcohols (I-2) are concretely those having two hydroxyl groups in the molecule, including, for example, alkyl or alkenyldiols having from 2 to 40 carbon atoms (in which the alkyl or alkenyl group may be linear or branched, the double bond of the alkenyl group may be in any desired position, and the hydroxyl group may also be in any desired position) such as ethylene glycol, diethylene glycol, polyethylene glycol, propylene glycol, dipropylene glycol, polypropylene glycol, neopentyl glycol, 1,3-propanediol, 1,4-butanediol, 1,2-butanediol, 2-methyl-1,3-propanediol, 1,5-pentanediol, 1,6-hexanediol, 2-ethyl-2-methyl-1,3-propanediol, 2-methyl-2, 4-pentanediol, 1,7-heptanediol, 2-methyl-2-propyl-1,3-propanediol, 2,2-diethyl-1,3-propanediol, 1,8-octanediol, 1,9-nonanediol, 2-butyl-2-ethyl-1,3-propanediol, 1,10-decanediol, 1,11-undecanediol, 1,12-dodecanediol, 1,13-tridecanediol, 1,14-tetradecanediol, 1,15-heptadecanediol, 1,16-hexadecanediol, 1,17-heptadecanediol, 1,18-octadecanediol, 1,19-nonadecanediol, 1,20-eicosadecanediol; (alkyl)cycloalkanediols (in which the alkyl group may be linear or branched, and the alkyl group and the hydroxyl group may be in any desired position) such as cyclohexanediol, methylcyclohexanediol; dihydric(alkyl)aryl alcohols having from 2 to 40 carbon atoms (in which the alkyl group may be linear or branched, and the alkyl group and the hydroxyl group may be in any desired position) such as benzenediol (catechol, etc.), methylbenzenediol, ethylbenzenediol, butylbenzenediol (p-tert-butylcatechol, etc.) dibutylbenzenediol (4,6-di-tert-butylresorcinol, etc.), 4,4'-thiobis(3-methyl-6-tert-butylphenol), 4,4'-butylidenebis(3-methyl-6-tert-butylphenol), 2,2'-methylenebis(4-methyl-6-tert-butylphenol), 2,2'-thiobis(4,6-di-tert-butylresorcinol), 2,2'-methylenebis(4-ethyl-6-tert-butylphenol), 4,4'-methylenebis(2,6-di-tert-butylphenol), 2,2'-(3,5-di-tert-butylhydroxy)propane, 4,4'-cyclohexylidenebis(2,6-di-tert-butylphenol); p-tert-butylphenol/formaldehyde condensate, p-tert-butylphenol/acetaldehyde condensate; and their mixtures.

Of those, preferred are ethylene glycol, propylene glycol, neopentyl glycol, 1,4-butanediol, 1,5-pentanediol, neopentyl glycol, 1,6-hexanediol, 2-methyl-2,4-pentanediol, 2-ethyl-2-methyl-1,3-propanediol, 1,7-heptanediol, 1,8-octanediol, 1,9-nonanediol, 1,10-decanediol, 1,11-undecanediol and 1,12-dodecanediol, in that they may more effectively lower the friction at the sliding surfaces of the DLC coated sliding member (A) and of any sliding member (B). In addition, high-molecular-weight hindered alcohols having a molecular weight of at least 300, preferably at least 400 such as 2,6-di-tert-butyl-4-(3,5-di-tert-butyl-4-hydroxybenzyl)phenyl alcohol are also preferred in that they are hardly volatile even at high temperatures (for example, under sliding condition in internal-combustion engines) and are highly resistant to heat, and they can well exhibit their friction-reducing effect and can impart excellent antioxidation stability to lubricating oil.

Tri- and higher polyalcohols (I-3) are concretely those having three or more hydroxyl groups. In general, tri- to deca-alcohols, preferably tri- to hexa-alcohols are used. Examples of these components are trimethylolalkanes such as glycerin, trimethylolethane, trimethylolpropane, trimethylolbutane; as well as erythritol, pentaerythritol, 1,2,4-butanetriol, 1,3,5-pentanetriol, 1,2,6-hexanetriol, 1,2,3,4-butanetetrol, sorbitol, adonitol, arabitol, xylitol, mannitol; and their polymers or condensates (e.g., glycerin dimers to octamers such as diglycerin, triglycerin, tetraglycerin; trimethylolpropane dimers to octamers such as ditrimethylolpropane; pentaerythritol dimers to tetramers such as dipentaerythritol; sorbitan; condensates such as sorbitol/glycerin condensate (including intramolecular condensates, intermolecular condensates, and self-condensates)).

Saccharides such as xylose, arabitol, ribose, rhamnose, glucose, fructose, galactose, mannose, sorbose, cellobiose, mannose, isomaltose, trehalose and sucrose are also usable.

Of those, more preferred are tri to hexa-alcohols such as glycerin, trimethylolalkanes (e.g., trimethylolethane, trimethylolpropane, trimethylolbutane), pentaerythritol, 1,2,4-butanetriol, 1,3,5-pentanetriol, 1,2,6-hexanetriol, 1,2,3,4-butanetetrol, sorbitol, sorbitan, sorbitol/glycerin condensate, adonitol, arabitol, xylitol, mannitol, and their mixtures; and even more preferred are glycerin, trimethylolethane, trimethylolpropane, pentaerythritol, sorbitan and their mixtures.

Especially preferred are polyalcohols having an oxygen content of at least 20%, preferably at least 30%, more preferably at least 40%. Polyalcohols that are higher than hexa-alcohols will too much increase the viscosity.

The above-mentioned carboxylic acids (II) are compounds represented by the following general formula (2):

$$R\text{—}(COOH)_n, \quad (2)$$

for example, a compound containing one or more carboxyl groups.

Examples of carboxylic acids (II) are mentioned below:
Aliphatic monocarboxylic acids (fatty acids) (II-1);
Aliphatic polycarboxylic acids (II-2);
Carbon-cyclic carboxylic acids (II-3);
Heterocyclic carboxylic acids (II-4); and
Mixtures of two or more selected from the above four kinds of carboxylic acids (II-5).

Aliphatic monocarboxylic acids (fatty acids) (II-1) are concretely those having one carboxyl group in the molecule, including, for example, saturated aliphatic monocarboxylic acids having from 1 to 40 carbon atoms (in which the saturated aliphatic structure may be linear or branched) such as methanoic acid, ethanoic acid (acetic acid), propanoic acid (propionic acid), butanoic acid (butyric acid, isobutyric acid, etc.), pentanoic acid (valeric acid, isovaleric acid, pivalic acid, etc.), hexanoic acid (caproic acid, etc.), heptanoic acid, octanoic acid (caprylic acid, etc.), nonanoic acid (pelargonic acid, etc.), decanoic acid, undecanoic acid, dodecanoic acid (lauric acid, etc.), tridecanoic acid, tetradecanoic acid (myristic acid, etc.), pentadecanoic acid, hexadecanoic acid (palmitic acid, etc.), heptadecanoic acid, octadecanoic acid (stearic acid, etc.), nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid; and unsaturated aliphatic monocarboxylic acids having from 1 to 40 carbon atoms (in which the unsaturated aliphatic structure may be linear or branched, and the unsaturated bond may be in any desired position) such as propenoic acid (acrylic acid, etc.), propynoic acid (propiolic acid, etc.), butenoic acid (methacrylic acid, crotonic acid, isocrotonic acid, etc.), pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, octadecenoic acid (oleic acid, etc.), nonadecenoic acid, eicosenoic acid, heneicosenoic acid, docosenoic acid, tricosenoic acid, tetracosenoic acid, pentacosenoic acid, hexacosenoic acid, heptacosenoic acid, octacosenoic acid, nonacosenoic acid, triacontenoic acid.

Aliphatic polycarboxylic acids (II-2) include saturated or unsaturated aliphatic dicarboxylic acids having from 2 to 40 carbon atoms (in which the saturated aliphatic or unsaturated aliphatic structure may be linear or branched, and the unsaturated bond may be in any desired position) such as ethanediacid (oxalic acid), propane-diacid (malonic acid, etc.), butane-diacid (succinic acid, methylmalonic acid, etc.), pentane-diacid (glutaric acid, ethylmalonic acid, etc.), hexane-diacid (adipic acid, etc.), heptane-diacid (pimelic acid, etc.), octane-diacid (suberic acid, etc.), nonane-diacid (azelaic acid, etc.), decane-diacid (sebacic acid, etc.), propene-diacid, butene-diacid (maleic acid, fumaric acid, etc.), pentene-diacid (citraconic acid, mesaconic acid, etc.), hexene-diacid, heptene-diacid, octene-diacid, nonene-diacid, decene-diacid; saturated or unsaturated tricarboxylic acids (in which the saturated aliphatic or unsaturated aliphatic structure may be linear or branched, and the unsaturated bond may be in any desired position) such as propane-tricarboxylic acid, butane-tricarboxylic acid, pentane-tricarboxylic acid, hexane-tricarboxylic acid, heptane-tricarboxylic acid, octane-tricarboxylic acid, nonane-tricarboxylic acid, decane-tricarboxylic acid; and saturated or unsaturated tetracarboxylic acids (in which the saturated aliphatic or unsaturated aliphatic structure may be linear or branched, and the unsaturated bond may be in any desired position).

Carbon-cyclic carboxylic acids (II-3) are concretely those having one or more carboxyl groups in the carbon-cyclic molecule, including, for example, naphthene ring-having, mono, di, tri or tetracarboxylic acids having from 3 to 40 carbon atoms (in which the alkyl or alkenyl group, if any therein, may be linear or branched, and the double bond, if any therein, may be in any desired position, and the number and the position of the substituents are not defined) such as cyclohexane-monocarboxylic acid, methylcyclohexane-monocarboxylic acid, ethylcyclohexane-monocarboxylic acid, propylcyclohexane-monocarboxylic acid, butylcyclohexane-monocarboxylic acid, pentylcycohexane-monocarboxylic acid, hexylcyclohexane-monocarboxylic acid, heptylcyclohexane-monocarboxylic acid, octylcyclohexane-monocarboxylic acid, cycloheptane-monocarboxylic acid, cyclooctane-monocarboxylic acid, trimethylcyclopentane-dicarboxylic acid (camphor acid, etc.); aromatic monocarboxylic acids having from 7 to 40 carbon atoms such as benzenecarboxylic acid (benzoic acid), methylbenzenecarboxylic acid (toluic acid, etc.), ethylbenzenecarboxylic acid, propylbenzenecarboxylic acid, benzenedicarboxylic acid (phthalic acid, isophthalic acid, terephthalic acid, etc.), benzenetricarboxylic acid (trimellitic acid, etc.), benzeneteracarboxylic acid (pyromellitic acid, etc.), naphthalenecarboxylic acid (naphthoic acid, etc.); mono, di, tri or tetracarboxylic acids having an aryl group with from 7 to 40 carbon atoms (in which the alkyl or alkenyl group, if any therein as a substituent, may be linear or branched and the double bound, if any therein, may be in any desired position, and the number and the position of the substituents are not defined) such as phenylpropanoic acid (hydroatropic acid), phenylpropenoic acid (atropic acid, cinnamic acid, etc.), salicylic acid, alkylsalicylic acid having one or more alkyl groups with from 1 to 30 carbon atoms.

Heterocyclic carboxylic acids (II-4) are concretely those having one or more carboxyl groups in the molecule, including, for example, those having from 5 to 40 carbon atoms such as furanecarboxylic acid, thiophenecarboxylic acid, pyridinecarboxylic acid (nicotinic acid, isonicotinic acid, etc.).

The above-mentioned esters (III) are compounds represented by the following general formula (3):

for example, a compound containing one or more ester bonds.
Examples of esters (III) are mentioned below:
Esters of aliphatic monocarboxylic acids (fatty acids) (III-1);
Esters of aliphatic polycarboxylic acids (III-2);
Esters of carbon-cyclic carboxylic acids (III-3);
Esters of heterocyclic carboxylic acids (III-4);
Mixtures of any compounds selected from the above five kinds of esters (III-5).

Esters of the above III-1 to III-5 may be complete esters in which the hydroxyl group and the carboxyl group are all esterified, or partial esters in which the hydroxyl group or the carboxyl group partially remains as such.

The ester of aliphatic monocarboxylic acids (fatty acids) (III-1) is an ester of one or more selected from the above-mentioned aliphatic monocarboxylic acids (fatty acids) (II-1) and one or more selected from the above-mentioned mono, di, tri or higher polyalcohols (I-1 to I-3). Examples of the esters are aliphatic monocarboxylic acids. Concrete examples of the esters are glycerin monooleate, glycerin dioleate, sorbitan monooleate, sorbitan dioleate, and the like.

The ester of aliphatic polycarboxylic acids (III-2) is an ester of one or more selected from the above-mentioned aliphatic polycarboxylic acids (II-1) and one or more selected from the above-mentioned mono, di, tri or higher polyalcohols (I-1 to I-3). Its preferred examples are diesters of one or more polycarboxylic acid selected from dicarboxylic acids having from 2 to 40, preferably from 4 to 18, more preferably from 6 to 12 carbon atoms, and one or more selected from monoalcohols having from 4 to 40, preferably from 4 to 18, more preferably from 6 to 14, such as dibutyl maleate, ditridecyl glutamate, di-2-ethylhexyl adipate, diisodecyl adipate, ditridecyl adipate, di-2-ethylhexyl sebacate, and copolymers of these diesters (e.g., dibutyl maleate) and poly-α-olefins having from 4 to 16 carbon atoms; and esters of α-olefin adducts to acetic anhydride or the like, and alcohols having from 1 to 40 carbon atoms.

The ester of carbon-cyclic carboxylic acids (III-3) is an ester of one or more selected from the above-mentioned carbon-cyclic carboxylic acids (II-3), and one or more selected from the above-mentioned mono, di, tri or higher polyalcohols (I-1-I-3). Its preferred examples are aromatic carboxylic acid ester such as phthalic acid ester, trimellitic acid ester, pyromellitic acid ester, salicylic acid ester.

The ester of heterocyclic carboxylic acids (III-4) is an ester of one or more selected from the above-mentioned heterocyclic carboxylic acids (II-4), and one or more selected from the above-mentioned mono, di, tri or higher polyalcohols (I-1 to I-3).

The above-mentioned ethers (IV) are compounds represented by the following general formula (4):

for example, a compound containing one or more ether bonds.
Examples of ethers (IV) are mentioned below:
Saturated or unsaturated aliphatic ethers (IV-1);
Aromatic ethers (IV-2);
Cyclic ethers (IV-3);
Polyalcoholic esters (IV-4); and
Mixtures of two or more selected from the above three kinds of ethers (IV-5).

Saturated or unsaturated aliphatic ethers(aliphatic mono-ethers) are concretely saturated or unsaturated aliphatic ethers (IV-1) having from 1 to 40 carbon atoms (in which the saturated or unsaturated aliphatic structure may be linear or branched, and the unsaturated bond may be in any desired position) such as dimethyl ether, diethyl ether, di-n-propyl ether, diisopropyl ether, dibutyl ether, diisobutyl ether, di-n-amyl ether, diisoamyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, diheptadecyl ether, dioctadecyl ether, dinonadecyl ether, dieicosyl ether, methyl ethyl ether, methyl n-propyl ether, methyl isopropyl ether, methyl isobutyl ether, methyl tert-butyl ether, methyl n-amyl ether, methyl isoamyl ether, ethyl n-propyl ether, ethyl isopropyl ether, ethyl isobutyl ether, ethyl tert-butyl ether, ethyl n-amyl ether, ethyl isoamyl ether, divinyl ether, diallyl ether, methyl vinyl ether, methyl allyl ether, ethyl vinyl ether, ethyl allyl ether.

Concretely, aromatic ethers (IV-2) include, for example, anisole, phenetole, phenyl ether, benzyl ether, phenyl benzyl ether, α-naphthyl ether, β-naphthyl ether, polyphenyl ether, perfluoroether; and these may have a saturated or unsaturated group (in which the saturated or unsaturated group may be linear or branched, and the unsaturated bond may be in any desired position, and the number and the position of the substituents are not defined). Preferably, these are liquid under the service condition thereof, especially at room temperature.

Concretely, cyclic ethers (IV-3) are those having from 2 to 40 carbon atoms, including, for example, ethylene oxide, propylene oxide, trimethylene oxide, tetrahydrofuran, tetrahydropyran, dioxane, glycidyl ether; and these may have a saturated or unsaturated group, a carbon ring, or a saturated or unsaturated aliphatic group-having carbon ring (in which the saturated or unsaturated group may be linear or branched, and the unsaturated bond may be in any desired position, and the number and the position of the substituents are not defined).

Ethers of polyalcohols (IV-4) include one or not less than two ethers of one or not less than two polyalcohols selected from the above-mentioned dialcohols or trialcohols (I-2 to I-2) or Monoalcohols. The ethers referred to herein may be complete ethers in which all hydroxyl groups of polyalcohols are etherified, or partial ethers in which a part of hydroxyl groups remains, in which the partial ethers are preferable since they exhibit a low friction properties.

The ketones (V) are compounds represented by the following general formula (5):

$$R—(CO—R')_n, \qquad (5)$$

for example, an oxygen-containing organic compound and a compound containing one or more carbonyl bonds.

Specific examples of the aforementioned ketones (V) include:
a saturated or unsaturated aliphatic ketone (V-1);
a carbon-ring ketone (V-2);
a heterocyclic ketone (V-3);
a ketone alcohol (V-4);
a ketone acid (V-5); and
a mixture of two or more selected from ketones of the aforementioned five kinds of ketones (V-6).

The saturated or unsaturated aliphatic ketone (V-1) can specifically be a saturated or unsaturated aliphatic ketone with 1 to 40 carbon atoms (which may be linear or ramified or branched and may have an unsaturated bond in an arbitrary position), such as acetone, methyl ethyl ketone, methyl propyl ketone, methyl isopropyl ketone, methyl butyl ketone, methyl isobutyl ketone, pinacolone, diethyl ketone, butyrone, diisopropyl ketone, methyl vinyl ketone, mesityl oxide or methyl heptenone.

Also the carbon-ring ketone (V-2) can specifically be a carbon-ring ketone with 1 to 40 carbon atoms such as cyclobutanone, cyclopentanone, cyclohexanone, acetophenone, propiophenone, butyrophenone, valerophenone, benzophenone, dibenzylketone or 2-acetonaphthone, which may have a saturated or unsaturated aliphatic group (that may be linear or unsaturated, arbitrary in the position of an unsaturated bond and also arbitrary in the position and number of substitution).

Also the heterocyclic ketone (V-3) can specifically be a carbocyclic ketone with 1 to 40 carbon atoms such as acetothienone or 2-acetofuron, which may have a saturated or unsaturated aliphatic group (that may be linear or ramified, arbitrary in the position of an unsaturated bond and also arbitrary in the position and number of substitution).

Also the ketone alcohol (ketol) (V-4) can specifically be a ketone alcohol with 1 to 40 carbon atoms such as acetol, acetoin, acetoethyl alcohol, diacetone alcohol, phenacyl alcohol or benzoin, which may have a carbon ring or a hetero ring (heterocycle) or may have a carbon ring or a hetero ring having a saturated or unsaturated aliphatic group (that may be linear or ramified, arbitrary in the position of an unsaturated bond and also arbitrary in the position and number of substitution).

Also the ketone acid (V-5) can specifically be a ketone acid with 1 to 40 carbon atoms for example an α-ketone acid such as piruvic acid, benzoylformic acid, or phenylpiruvic acid, a β-ketone acid such as acetoacetic acid, propionylacetic acid or benzoylacetic acid, or a γ-ketone acid such as levulinic acid or β-benzoylpropionic acid.

The aldehydes (VI) are oxygen-containing organic compounds represented by the following general formula (6):

$$R(CHO)_n, \qquad (6)$$

for example, a compound having one or two aldehyde groups.

Specific examples of the aforementioned aldehydes include (VI):
a saturated or unsaturated aliphatic aldehyde (V1-1);
a carbon-ring aldehyde (V1-2);
a heterocyclic aldehyde (V1-3); and
a mixture of two or more selected from the aldehydes of the aforementioned three kinds of aldehydes (V1-4).

The saturated or unsaturated aliphatic aldehyde (V1-1) can specifically be a saturated or unsaturated aliphatic aldehyde with 1 to 40 carbon atoms (such saturated or unsaturated aliphatic structure may be linear or ramified with an arbitrary position in an unsaturated bond) such as formaldehyde, acetaldehyde, propionaldehyde, butyl aldehyde, isobutyl aldehyde, valeric aldehyde, isovalericaldehyde, pivalicaldehyde, caproicaldehyde, heptonic aldehyde, capryl aldehyde, peralgonic aldehyde, capric aldehyde, undecyl aldehyde, lauric aldehyde, tridecyl aldehyde, myristic aldehyde, pentadecyl aldehyde, palmitic aldehyde, margaric aldehyde, stearic aldehyde, acrolein, crotonic aldehyde, propionic aldehyde, glyoxal or succinic aldehyde.

The carbon-ring aldehyde (V1-2) can specifically be a carbon-ring aldehyde with 1 to 40 carbon atoms such as benzaldehyde, o-toluic aldehyde, m-toluic aldehyde, p-toluic aldehyde, salicyl aldehyde, cinnamic aldehyde, α-naphthoic aldehyde, or β-naphthoic aldehyde, which may have a saturated or unsaturated aliphatic group (that may be linear or ramified, arbitrary in the position of an unsaturated bond and also arbitrary in the position and number of substitution).

The heterocyclic aldehyde (V1-3) can specifically be a heterocyclic aldehyde with 1 to 40 carbon atoms such as furfural, which may have a saturated or unsaturated aliphatic group (that may be linear or ramified, arbitrary in the position of an unsaturated bond and also arbitrary in the position and number of substitution).

The carbonates (V11) are oxygen-containing organic compounds represented by the following general formula (7):

$$R—(O—COO—R')_n, \qquad (7)$$

for example, a compound having one or two carbonate bonds.

The carbonates (VII) can specifically be a carbonate with 1 to 40 carbon atoms having a saturated or unsaturated aliphatic group, a carbon-ring group, a carbon-ring group having a saturated or unsaturated aliphatic group, or a saturated or unsaturated aliphatic group having a carbon-ring group (such saturated or unsaturated aliphatic group being linear or ramified, arbitrary in the position of an unsaturated bond and also arbitrary in the position and number of substitution), such as dimethyl carbonate, diethyl carbonate, di-n-propyl carbonate, diisopropyl carbonate, di-n-butyl carbonate, diisobutyl carbonate, di-tert-butyl carbonate, dipentyl carbonate, dihexyl carbonate, diheptyl carbonate, dioctyl carbonate, dinonyl carbonate, didecyl carbonate, diundecyl carbonate, didodecyl carbonate, ditridecyl carbonate, ditetradecyl carbonate, dipentadecyl carbonate, dihexadecyl carbonate, diheptadecyl carbonate, dioctadecyl carbonate, or diphenyl carbonate, or a hydroxy(poly)oxyalkylene carbonate formed by adding an alkylene oxide to such carbonate.

On the other hand, R and R' in the general formula (1)-(7) each independently represents a hydrocarbon group such as an alkyl group, an alkenyl group, an alkylene group, a cycloalkyl group, an alkylcycloalkyl group, an aryl group, an alkylaryl group, or an arylalkyl group (such hydrocarbon group may further contain one or more kinds of group or bond selected from a hydroxyl group, a carboxyl group, a carbonyl group, an ester bond and an ether bond, and may further contain an element other than carbon, hydrogen and oxygen, such as nitrogen or sulfur (for example a heterocyclic compound), a halogen (such as fluorine or chlorine), phosphorus, boron or a metal.

The hydrocarbon group is not particularly restricted in the number of carbon atoms, but preferably has 1 to 40 carbon atoms, more preferably 2 to 30 carbon atoms and particularly preferably 3 to 20 carbon atoms.

Examples of the alkyl group include an alkyl group with 1 to 40 carbon atoms such as a methyl group, an ethyl group, an n-propyl group, an isopropyl group, an n-butyl group, an isobutyl group, a sec-butyl group, a tert-butyl group, a linear or ramified pentyl group, a linear or ramified hexyl group, a linear or ramified heptyl group, a linear or ramified octyl group, a linear or ramified nonyl group, a linear or ramified decyl group, a linear or ramified undecyl group, a linear or ramified dodecyl group, a linear or ramified tridecyl group, a linear or ramified tetradecyl group, a linear or ramified pentadecyl group, a linear or ramified hexadecyl group, a linear or ramified heptadecyl group, a linear or ramified octadecyl group, a linear or ramified nonadecyl group, a linear or ramified icosyl group, a linear or ramified henicosyl group, a linear or ramified docosyl group, a linear or ramified tricosyl group, or a linear or ramified tetracosyl group, preferably an alkyl group with 2 to 30 carbon atoms and particularly preferably an alkyl group with 3 to 20 carbon atoms.

Examples of the alkenyl group include an alkenyl group with 2 to 40 carbon atoms such as a vinyl group, a linear or ramified propenyl group, a linear or ramified butenyl group, a linear or ramified pentenyl group, a linear or ramified hexenyl group, a linear or ramified heptenyl group, a linear or ramified octenyl group, a linear or ramified nonenyl group, a linear or ramified decenyl group, a linear or ramified undecenyl group, a linear or ramified dodecenyl group, a linear or ramified tridecenyl group, a linear or ramified tetradecenyl group, a linear or ramified pentadecenyl group, a linear or ramified hexadecenyl group, a linear or ramified heptadecenyl group, a linear or ramified octadecenyl group, a linear or ramified nonadecenyl group, a linear or ramified icosenyl group, a linear or ramified henicosenyl group, a linear or ramified docosenyl group, a linear or ramified tricosenyl group, or a linear or ramified tetracosenyl group, preferably an alkenyl group with 2 to 30 carbon atoms and particularly preferably an alkenyl group with 3 to 20 carbon atoms.

Examples of the cycloalkyl group include a cycloalkyl group with 3 to 40 carbon atoms such as a cyclopentyl group, a cyclohexyl group, a cycloheptyl group or a cyclooctyl group, preferably a cycloalkyl group with 3 to 20 carbon atoms and particularly preferably a cycloalkyl group with 5 to 8 carbon atoms.

Examples of the alkylcycloalkyl group include an alkylcycloalkyl group with 4 to 40 carbon atoms such as a methylcyclopentyl group, a dimethylcyclopentyl group (including all structural isomers), a methylethylcyclopentyl group (including all structural isomers), a diethylcyclopentyl group (including all structural isomers), a methyl cyclohexyl group, a dimethylcyclohexyl group (including all structural isomers), a methylethylcyclohexyl group (including all structural isomers), a diethylcyclohexyl group (including all structural isomers), a methylcycloheptyl group, a dimethylcycloheptyl group (including all structural isomers), a methylethylcycloheptyl group (including all structural isomers), or a diethylcycloheptyl group (including all structural isomers), preferably an alkylcycloalkyl group with 5 to 20 carbon atoms, particularly preferably an alkylcycloalkyl group with 6 to 12 carbon atoms.

Examples of the aryl group include an aryl group with 6 to 20 carbon atoms such as a phenyl group or a naphthyl group, preferably an aryl group with 6 to 10 carbon atoms.

Examples of the alkylaryl group include an alkylaryl group with 7 to 40 carbon atoms for example a mono-substituted phenyl group such as a tolyl group (including all structural isomers), an ethylphenyl group (including all structural isomers), a linear or ramified propylphenyl group (including all structural isomers), a linear or ramified butylphenyl group (including all structural isomers), a linear or ramified pentylphenyl group (including all structural isomers), a linear or ramified hexylphenyl group (including all structural isomers), a linear or ramified heptylphenyl group (including all structural isomers), a linear or ramified octylphenyl group (including all structural isomers), a linear or ramified nonylphenyl group (including all structural isomers), a linear or ramified decylphenyl group (including all structural isomers), a linear or ramified undecylphenyl group (including all structural isomers), or a linear or ramified dodecylphenyl group (including all structural isomers); or an aryl group having two more, same or different linear or ramified alkyl groups such as a xylyl group (including all structural isomers), a diethylphenyl group, a dipropylphenyl group, a 2-methyl-6-tert-butylphenyl group, a 2,6-di-tert-butyl-4-methylphenyl group, or a 2,6-di-tert-butyl-4-(3,5-di-tert-butyl-4-benzyl)phenyl group (alkyl group may further include an aryl group, an alkylaryl group or an arylalkyl group including all structural isomers), preferably an alkylaryl group with 7 to 20 carbon atoms and particularly preferably an alkylaryl group with 7 to 12 carbon atoms.

Also examples of the arylalkyl group include an arylalkyl group with 7 to 40 carbon atoms such as a benzyl group, a phenylethyl group, a phenylpropyl group (including isomers of propyl group), a phenylbutyl group (including isomers of butyl group), a phenylpentyl group (including isomers of pentyl group) or a phenylhexyl group (including isomers of hexyl group), preferably an arylalkyl group with 7 to 20 carbon atoms and particularly preferably an arylalkyl group with 7 to 12 carbon atoms.

Derivatives of the above-mentioned organic oxygen-containing organic compounds (C) can be used like the oxygen-containing organic compounds. Examples of the derivatives are nitrogen-containing compounds, sulfur or sulfur-containing compound, boron-containing compound, halogen elements or halogen element-containing compounds, metal elements or metal-containing compounds (organic or inorganic ones), and compounds obtained by reacting alkylene oxide; however, the derivatives are not limited to the above ones. The derivatives concretely include, for example, compounds prepared by sulfidizing one selected from the above-mentioned alcohols, carboxylic acids, esters and ethers, ketones, aldehydes and carbonates; compounds prepared by halogenating (fluorinating, chlorinating) the same one; its reaction products with acids, such as sulfuric acid, nitric acid, boric acid, phosphoric acid, or their esters or metal salts; and its reaction products with metals, metal-containing compounds or amine compounds.

Of those, preferred are reaction products of one or more selected from alcohols and carboxylic acids and their derivatives, with amine compounds (e.g., Mannich reaction products, acylated products, amides).

The amine compounds as referred to herein include ammonia, monoamines, diamines, and polyamines. More concretely, their examples are ammonia; alkylamines having an alkyl group with from 1 to 30 carbon atoms (in which the alkyl group may be linear or branched) such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, stearylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, methylethylamine, methylpropylamine, methylbutylamine, ethylpropylamine, ethylbutylamine, and propylbutylamine; alkenylamines having an alkenyl group with from 2 to 30 carbon atoms (in which the alkenyl group may be linear or branched) such as ethenylamine, propenylamine, butenylamine, octenylamine, and oleylamine; alkanolamines having an alkanol group with from 1 to 30 carbon atoms (in which the alnanol group may be linear or branched) such as methanolamine, ethanolamine, propanolamine, butanolamine, pentanolamine, hexanolamine, heptanolamine, octanolamine, nonanolamine, methanolethanolamine, methanolpropanolamine, methanolbutanolamine, ethanolpropanolamine, ethanolbutanolamine, and propanolbutanolamine; alkylenediamines having an alkylene group with from 1 to 30 carbon atoms, such as methylenediamine, ethylenediamine, propylenediamine, and butylenediamine; polyamines such as diethylenetriamine, triethylenetetramine, tetraethylenepentamine, pentaethylenehexamine; compounds derived from the above-mentioned monoamines, diamines or polyamines and further having an alkyl or alkenyl group with from 8 to 20 carbon atoms, such as undecyldiethylamine, undecyldiethanolamine, dodecyldipropanolamine, oleyldiethanolamine, oleylpropylenediamine, stearyltetraethylenepentamine; heterocyclic compounds such as N-hydroxyethyloleylimidazoline; alkylene oxide adducts of these compounds; and their mixtures.

Of those nitrogen-containing compounds, preferred are aliphatic amines having an alkyl or alkenyl group with from 10 to 20 carbon atoms (these may be linear or branched) such as decylamine, dodecylamine, tridecylamine, heptadecylamine, octadecylamine, oleylamine and stearylamine.

Of the derivatives of these oxygen-containing organic compounds, preferred are amides of carboxylic acid having 8 to 20 carbon atoms, of the above-mentioned aliphatic monocarboxylic acids (fatty acids) (II-1) such as oleic amide.

While the oxygen-containing organic compounds have been explained above, those having hydroxyl group is preferable of them because those are excellent in friction reduction effect. Of hydroxyl groups, preferred are alcoholic hydroxyl groups as compared with hydroxyl groups which are directly combined with carbonyl groups such as carboxyl groups. Further, Although the number of such hydroxyl groups in the compound is particularly not limited, it is preferable to have more hydroxyl groups because of being excellent in friction lowering effect. However, there is a case where the number of hydroxyl groups is limited from the viewpoint of solubility, in case of being used together with a medium such as lubricating oil discussed after.

Examples of the aliphatic amine compound (D) in the low-friction agent composition of the present invention are aliphatic amine compounds each having $C_6$-$C_{30}$ straight or branched hydrocarbon chains or groups, preferably $C_8$-$C_{24}$ straight or branched hydrocarbon chains, more preferably $C_{10}$-$C_{20}$ straight or branched hydrocarbon chains. When the carbon number of the hydrocarbon chain is not within the range of 6 to 30, there arises a possibility that the lubricating oil may not produce a sufficient friction reducing effect as expected. It is a matter of course that other hydrocarbon groups are had if straight or branched aliphatic hydrocarbon groups within the above carbon number range.

Specific examples of the $C_6$-$C_{30}$ straight or branched hydrocarbon chain include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl.

The above alkyl and alkenyl groups include all possible straight structures or branched structures. Additionally, the position of double bonds in alkenyl groups is free.

The aliphatic amine compound (D) can be exemplified by various amine compounds and derivatives of these, such as the nitrogen-containing heterocyclic compounds of monoamine, polyamine, alkanolamine, imidazoline compound and the like each having straight or branched aliphatic hydrocarbon group having the carbon number of 6 to 30.

Monoamine can be concretely exemplified by laurylamine, lauryldimethylamine, palmitylamine, stearylamine, oleylamine and the like.

Polyamine can be concretely exemplified by stearyltetraethylenepentamine, oleylpropylenediamine and the like.

Alkanolamine can be concretely exemplified by lauryldiethanolamine, dodecyldipropanolamine, oleyldiethanolamine and the like.

The nitrogen-containing heterocyclic compounds are concretely exemplified by N-hydroxyethyloleylimidazolyne and the like.

The derivatives are exemplified by alkylene oxide adducts, acid-modified compounds and the like.

The alkylene oxide adducts are exemplified by compounds which are obtained upon addition of alkylene oxide to nitrogen oxide in the above-mentioned various amine compounds, concretely by N,N-dipolyoxyalkylene-N-alkyl(alkenyl) amines which are obtained upon addition of alkylene oxide to primary monoamine having alkylene group and alkenyl group each having the carbon number of 6 to 28, more concretely N,N-dipolyoxyalkylene-N-oleylamines and the like.

The acid-modified compounds are exemplified by compounds prepared by reacting the above various amine compounds with carboxylic acids (II), preferably the above-mentioned aliphatic monocarboxylic acids (II-1) (more preferably ones having the carbon number of 2 to 30), the above-mentioned aliphatic polycarboxylic acids (II-2) (more preferably ones having the carbon number of 2 to 30, or containing oxalic acid or the like), the above-mentioned carbon-cyclic carboxylic acids (II-3) (more preferably ones having the carbon number of 6 to 30, or containing phthalic acid, trimellitic acid and pyromellitic acid or the like) so as to neutralize or amidate the whole or part of the remaining amino and/or imino groups.

The above-mentioned oxygen-containing compound (C) and aliphatic amine compound (D) are used in a sliding surfaces of the DLC coated sliding member (A) and the sliding member (B), singly (or in an amount of 100%) as the low-friction agent composition, thereby exhibiting an extremely excellent low friction characteristics. However, as the low-friction agent composition in the present invention one in which other components are blended to the oxygen-containing organic compound (C) and/or the aliphatic amine compound (D) may be used and supplied to the sliding surfaces so as to lubricate the sliding surfaces. As the other components, a medium such as lubricating oil base oil, various additives and the like are exemplified.

The contained amount of the oxygen-containing organic compound (C) or the aliphatic amine compound (D) is not particularly restricted; however, the lower limit of the contained amount based on the total amount (total mass) of the low-friction agent composition is normally 0.001%, preferably 0.05%, more preferably 0.1%, particularly preferably 0.5% from the view point of friction reduction effect. The upper limit of the contained amount is 100% as mentioned above. In case that other components, particularly the medium is blended, the upper limit based on the total amount of the low-friction agent composition is normally 50%, preferably 20% m, more preferably 10%, particularly preferably 5% from the viewpoint of solubility to the medium and storage stability. In the present invention, even addition of the oxygen-containing organic compound (C) and/or the aliphatic amine compound (D) in a small amount of about 0.1 to 2% can exhibit an excellent low friction characteristics. Additionally, if the solubility and storing stability of the aliphatic amine compound (D) to the medium is taken into serious consideration, it is preferable that the upper limit is preferably 3.0%, more preferably 2.0%, further preferably 1.4%.

As the above-mentioned medium, concrete examples are mineral oil, synthetic oil, natural fat and oil, diluted oil, grease, wax, hydrocarbons having the carbon number of 3 to 40, hydrocarbon solvents, organic solvents other than the hydrocarbon solvents, water and the like, and a mixture of these, and particularly these in the state of liquid, grease or wax under a sliding condition and at a normal temperature.

As the above-mentioned medium there is particularly preferably employed a lubricating oil base oil (a base oil of the lubricating oil). Such lubricating oil base oil is not particularly limited and any ordinary base oil, either mineral oil type or synthetic type, for lubricant composition can be employed.

Examples of the lubricating oil base oil of mineral oil type include a product formed by subjecting a lubricant fraction, obtained as a result of atmospheric distillation or vacuum distillation of crude oil, to at least one of solvent deasphalting, solvent extraction, hydrocracking, solvent dewaxing, hydrorefining and wax isomerization, particularly a base oil subjected to hydrocracking, hydrorefining or wax isomerization. Among such products, there is preferred a mineral oil obtained by hydrorefining or hydrocracking, or an isoparaffinic mineral oil obtained by isomerization of GTL (gas-to-liquid) wax by a Fischer-Tropsche process or of normal paraffin-rich wax obtained in a dewaxing step of lubricant oil.

Examples of the lubricating oil base oil of synthetic type include an alkylnaphthalene, an alkylbenzene, a polybutene and a hydrogenated product thereof; a poly-α-olefin such as a 1-octene oligomer, a 1-decene oligomer, an ethylene propylene oligomer or a hydrogenated product thereof; an isobutene oligomer and a hydrogenated product of isobutene oligomer; isoparaffin, alkylbenzene, alkylnaphthalene, diester (for example, trimethylpropane ester such as trimethylpropane capryoate, trimethylpropane pelargonate, trimethylolpropane pelargonate, trimethylolpropane isostearinate and the like; and pentaerythritol ester such as penthaerythritol-2-ethyhexanoete, pentaerythritol pelargonate), polyoxyalkylene glycol, dialykyldiphenyl ether, polyphenyl ether and the like; and mixtures of these. Preferable examples of the synthetic lubricating oil base oil are poly-α-olefin such as 1-octene oligomer, 1-decene oligomer and the like, and hydrogenated product thereof.

In addition to the use of the lubricating oil base oil of mineral oil type or the lubricating oil base oil of synthetic type either singly or as a mixture, it is also possible to use a mixture of two or more kinds of the base oil of mineral oil type or the base oil of synthetic type. Also in such mixture, a mixing ratio of two or more kinds of the base oils is not particularly restricted and can be selected arbitrarily.

A total aromatic content of the lubricating oil base oil is not particularly restricted, but is preferably 15% or less, more preferably 10% or less and further preferably 8%. A total aromatic content in the lubricating oil base oil exceeding 15% results in an inferior stability to oxidation and is undesirable. A composition of a high friction reducing effect can be obtained even with a total aromatic content in the lubricating oil base oil of 2% or less, or even 0%, for example of lubricating oil base oil such as a highly hydrocracking mineral oil, a wax isomerized mineral oil, a poly-α-olefin or a hydrogenated product, a hydrogenated product of 1-decene oligomer, polyole ester, or a mixture thereof. In case the content of the organic oxygen-containing organic compound (C) (excluding esters as the lubricating oil base oil) is higher (for example, at 2% or higher, since the storage stability may be deteriorated, it is preferable, if necessary, to regulate the total aromatic content (for example at 2% or higher) of the lubricating oil base oil by blending a solvent extracted mineral oil or an alkylbenzene, or to employ an ester as the lubricating oil base oil, thereby raising the solubility of the oxygen-containing compound (C). The "total aromatic content" means a content of an aromatic fraction measured according to ASTM D2549, and such aromatic fraction ordinarily contains alkylbenzenes, alkylnaphthalenes, anthracene, phenanthrene, alkylated substances thereof, a compound in which four or more benzene rings are condensed, and compounds containing heteroaromatic structure such as pyridines, quinolines, phenols and naphthols.

Further, the sulfur content in the lubricating oil base oil is not particularly restricted. The sulfur content based on the total amount of the base oil is preferably not more than 0.2%, more preferably not more than 0.1, further preferably not more than 0.05%. Particularly, hydrogenated purified mineral oil or synthetic base oil has a sulfur content of not more than 0.005% or substantially does not contain sulfur (not more than 5 ppm), and therefore these are preferably used as the base oil.

Also the lubricating oil base oil is not particularly restricted in a kinematic viscosity thereof, but in case of use as a lubricant composition for an internal combustion engine, a kinematic viscosity at 100° C. is preferably 2 mm$^2$/s or higher, and more preferably 3 mm$^2$/s or higher. Also an upper limit is preferably 20 mm$^2$/s or less, more preferably 10 mm$^2$/S or less and particularly preferably 8 mm²/s or less. A lubricating oil base oil with a kinematic viscosity at 100° C. of 2 mm²/S or higher allows to obtain a composition capable of sufficient oil film formation, an excellent lubricating property and a smaller evaporation loss of the base oil under a high temperature condition. On the other hand, a kinematic viscosity at 100° C. of 20 mm²/s or less reduces a fluid resistance, thereby allowing to obtain a composition with a smaller frictional resistance in a lubricated site. If the kinematic viscosity is less than 2 mm²/s, there is the possibility that a sufficient frictional resistance can be obtained while a vaporizing characteristics is inferior, which is not preferable. If the kinematic viscosity exceeds 20 mm²/s, there is the possibility that a low friction characteristics is difficult to be exhibited while a low temperature characteristics are degraded, which are not preferable. In the present invention, a mixture which are prepared by freely mixing two or more base oils selected from the above-mentioned base oils can be used, in which the base oils having the kinematic viscosity (as a single base oil) other than the above-mentioned can be also used as far as the base oils have a kinematic viscosity at 100° C. which viscosity is within the above-mentioned preferable range.

Furthermore, a viscosity index of the lubricating oil base oil is not particularly restricted but is preferably 80 or higher, and, in case of use as a lubricant composition for an internal combustion engine, it is preferably 100 or higher, more preferably 120 or higher, and may be within a range of 140 to 250. A lubricating oil base oil of a high viscosity index allows to obtain a composition excellent not only in a low-temperature viscosity characteristics but also in a less oil consumption, a fuel efficiency characteristics, and a friction reducing effect.

The low-friction agent composition may further include an ashless dispersant, an abrasion preventing agent or an extreme pressure agent, a metal-based detergent, an antioxidant, a viscosity index improver, a friction modifier agent other than (C) and (D), an antirusting agent, a nonionic surfactant, an antiemulsifier agent, a metal deactivator, or a defoaming agent singly or in a combination of plural kinds, for improving required performances.

As the ashless dispersant, various known ashless dispersants can be employed. For example polybutenylsuccinimide or a derivative thereof can be advantageously employed.

The above-mentioned polybutenyl succinimide include compounds represented by the following chemical formulas (1) and

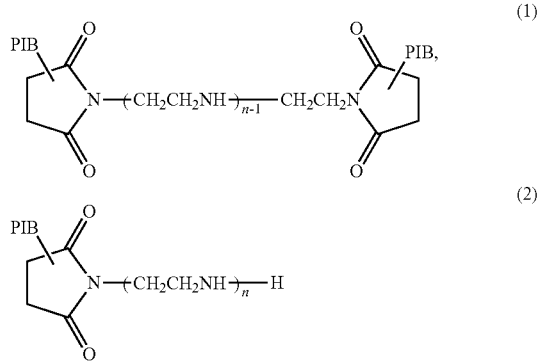

PIB in these chemical formulae represents a polybutenyl group derived from polybutene. The polybutene can be prepared by polymerizing high-purity isobutene or a mixture of 1-butene and isobutene in the presence of a boron fluoride catalyst or an aluminum chloride catalyst in such a manner that the polybutene attains a number-average molecular weight of 900 to 3,500, preferably 1,000 to 2,000. When the number-average molecular weight of the polybutene is less than 900, there is a possibility of failing to attain a sufficient detergent effect. When the number-average molecular weight of the polybutene exceeds 3,500, the polybutene may undesirably deteriorate in low-temperature fluidity.

In each of the chemical formulae, n represents an integer of 1 to 5, preferably 2 to 4, so as to attain a good detergent effect. In the production of the polybutenyl succinimide, the polybutene may be used after purified by removing trace amounts of fluorine and chlorine residues, which result from the above polybutene production catalyst, by any suitable treatment (such as adsorption process or washing process). The amount of the fluorine and chlorine residues is preferably controlled to 50 ppm or less, more preferably 10 ppm or less, most preferably 1 ppm or less.

The production method of the polybutenyl succinimide is not particularly restricted. For example, the polybutenyl succinimide can be prepared by reacting an chloride of the above-mentioned polybutene, or the polybutene from which fluorine and chlorine residues are removed, with maleic anhydride at 100 to 200° C. to form polybutenyl succinate, and then, reacting the thus-formed polybutenyl succinate with polyamine (such as diethylene triamine, triethylene tetramine, tetraethylene pentamine or pentaethylene hexamine).

The polybutenyl succinimide derivative can be exemplified by boron- and acid-modified compounds obtained by reacting the polybutenyl succinimide of the formulas (1) and (2) with boron compounds or oxygen-containing organic compounds so as to neutralize or amidate the whole or part of the remaining amino and/or imide groups. Among these, boron-containing polybutenyl succinimide, especially boron-containing bis (polybutenyl)succinimide, is preferably used.

The above boron compound can be a boric acid, a borate or a boric acid ester. Specific examples of the boric acid include orthoboric acid, metaboric acid and paraboric acid. Specific examples of the borate include: ammonium salts including ammonium borates, such as ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate. Herein, the content ratio of nitrogen to boron (B/N) by mass in the boron-containing polybutenyl succinimide is usually 0.1 to 3, preferably 0.2 to 1.

The above oxygen-containing organic compound can be exemplified by: $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid, undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or the derivative thereof added in the low-friction agent composition is not particularly restricted, and is preferably 0.1 to 15%, more preferably 1.0 to 12%, based on the total amount of the lubricating oil. When the amount of the polybutenyl succineimide and/or the derivative thereof is less than 0.1%, there arises a possibility of failing to attain a sufficient detergent effect. It becomes uneconomical when the amount of the polybutenyl succineimide and/or the derivative thereof exceeds 15%. In addition, such a large amount of the polybutenyl succineimide and/or the derivative thereof tends to cause a deterioration in demulsification ability.

The ashless dispersant other than the above-mentioned can be exemplified by polybutenylbenzylamines and polybutenylamines each having polybutenyl groups of number-average molecular weight of 900 to 3,500, polybutenyl succinimides having polybutenyl groups of number-average molecular weight of less than 900 and derivatives thereof.

As an antioxidant and as an anti-wear agent, various known ones can be blended. For example, it is preferable to contain zinc dithiophosphate represented by the following chemical formula (3) as an antioxidant and as an anti-wear agent.

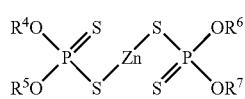

(3)

In the chemical formula (3), $R^4$, $R^5$, $R^6$ and $R^7$ each represent $C_1$-$C_{24}$ hydrocarbon groups. The $C_1$-$C_{24}$ hydrocarbon group is preferably a $C_1$-$C_{24}$ straight-chain or branched-chain alkyl group, a $C_3$-$C_{24}$ straight-chain or branched-chain alkenyl group, a $C_5$-$C_{13}$ cycloalkyl or straight-chain or branched-chain alkylcycloalkyl group, a $C_6$-$C_{18}$ aryl or straight-chain or branched-chain alkylaryl group, or a $C_7$-$C_{19}$ arylalkyl group. The above alkyl group or alkenyl group can be primary, secondary or tertiary.

Specific examples of $R^4$, $R^5$, $R^6$ and $R^7$ include: alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl and tetracosyl; alkenyl groups, such as propenyl, isopropenyl, butenyl, butadienyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl(oleyl), nonadecenyl, icosenyl, heneicosenyl, docosenyl, tricosenyl and tetracosenyl; cycloalkyl groups, such as cyclopentyl, cyclohexyl and cycloheptyl; alkylcycloalkyl groups, such as methylcyclopentyl, dimethylcyclopentyl, ethylcyclopentyl, propylcyclopentyl, ethylmethylcyclopentyl, trimethylcyclopentyl, diethylcyclopentyl, ethyldimethylcyclopentyl, propylmethylcyclopentyl, propylethylcyclopentyl, di-propylcyclopentyl, propylethylmethylcyclopentyl, methylcyclohexyl, dimethylcyclohexyl, ethylcyclohexyl, propylcyclohexyl, ethylmethylcyclohexyl, trimethylcyclohexyl, diethylcyclohexyl, ethyldimethylcyclohexyl, propylmethylcyclohexyl, propylethylcyclohexyl, di-propylcyclohexyl, propylethylmethylcyclohexyl, methylcycloheptyl, dimethylcycloheptyl, ethylcycloheptyl, propylcycloheptyl, ethylmethylcycloheptyl, trimethylcycloheptyl, diethylcycloheptyl, ethyldimethylcycloheptyl, propylmethylcycloheptyl, propylethylcycloheptyl, di-propylcycloheptyl and propylethylmethylcycloheptyl; aryl groups, such as phenyl and naphthyl; alkylaryl groups, such as tolyl, xylyl, ethylphenyl, propylphenyl, ethylmethylphenyl, trimethylphenyl, butylphenyl, propylmethylphenyl, diethylphenyl, ethyldimethylphenyl, tetramethylphenyl, pentylphenyl, hexylphenyl, heptylphenyl, octylphenyl, nonylphenyl, decylphenyl, undecylphenyl and dodecylphenyl; and arylalkyl groups, such as benzyl, methylbenzyl, dimethylbenzyl, phenethyl, methylphenethyl and dimethylphenethyl.

The above-mentioned hydrocarbon groups include all considerable straight or branched chain structures. The position of double bond of alkenyl group, the bonding position of alkyl group to cycloalkyl group and the bonding position of alkyl group to aryl group are free.

Specific examples of the zinc dithiophosphate usable include zinc diisopropyldithiophosphate, zinc diisobutyldithiophosphate, zinc di-sec-butyldithiophosphate, zinc di-sec-pentyldithiophosphate, zinc di-n-hexyldithiophosphate, zinc di-sec-hexyldithiophosphate, zinc di-octyldithiophosphate, zinc di-2-ethylhexyldithiophosphate, zinc di-n-decyldithiophosphate, zinc di-n-dodecyldithiophosphate, zinc diisotridecyldithiophosphate and mixtures thereof.

The amount of the zinc dithiophosphate added in the lubricating oil is not particularly restricted. The zinc dithiophosphate is preferably contained in an amount of 0.1% or less, more preferably in an amount of 0.06% or less, most preferably in a minimum effective amount, in terms of the phosphorus element based on the total amount of the lubricating oil in order to produce a higher friction reducing effect. When the amount of the zinc dithiophosphate exceeds 0.1%, arises a possibility of inhibiting the excellent friction reduction effect of the oxygen-containing organic compound (C) at sliding surfaces of the DLC member and various metal materials, particularly iron-based material.

The zinc dithiophosphate can be prepared by any known method. For example, the zinc dithiophosphate may be prepared by reacting alcohols or phenols having the above $R^4$, $R^5$, $R^6$ and $R^7$ hydrocarbon groups with phosphorous pentasulfide to form dithiophosphoric acid, and then, neutralizing the thus-formed dithiophosphoric acid with zinc oxide. Herein, the molecular structure of zinc dithiophosphate differs according to the alcohols and the like used as a raw material for the zinc dithiophosphate production.

The other anti-friction agent or extreme-pressure additive can be exemplified by disulfides, sulfurized fats and oils, olefin sulfides, phosphate esters having one to three $C_2$-$C_{20}$ hydrocarbon groups, thiophosphate esters, phosphite esters, thiophosphite esters and amine salts of these esters.

The metallic detergent can be any metallic-detergent compound commonly used for a lubricating oil. Specific examples of the metallic detergent usable in connection with the present invention include sulfonates, phenates and salicylates of alkali metals or alkali-earth metals; and mixtures of two or more thereof. Examples of the alkali metals include sodium (Na) and potassium (K), and examples of the alkali-earth metals include calcium (Ca) and magnesium (Mg). In connection with the present invention, sodium and calcium sulfonates, sodium and calcium phenates, and sodium and calcium salicylates are suitably used. The total base number and amount of the metallic detergent can be selected in accordance with the lubricating oil performance required. The total base number of the metallic detergent is usually 0 to 500 mgKOH/g, preferably 150 to 400 mgKOH/g, as measured by perchloric acid method according to ISO 3771 "Determination of base number—Perchloric acid potentiometric titration method". The amount of the metallic detergent is usually 0.1 to 10% based on the total amount of the lubricating oil.

The antioxidant can be any antioxidant compound commonly used for a lubricating oil. Specific examples of the antioxidant usable in connection with the present invention include: phenolic antioxidants, such as 4,4-methylenebis(2, 6-di-tert-butylphenol) and octadecyl-3-(3,5-di-tert-butyl-4-hydroxyphenyl)propionate; amino antioxidants, such as phenyl-α-naphthylamine, alkylphenyl-α-naphthylamine and alkyldiphenylamine; and mixtures of two or more thereof. The amount of the antioxidant is usually 0.01 to 5% based on the total amount of the lubricating oil.

The viscosity index improver can be concretely exemplified by: non-dispersion type viscosity index improvers, such as copolymers of one or two monomers selected from various methacrylic acids, and hydrides of the copolymers; and dispersion type viscosity index improvers, such as copolymers of methacrylates (including nitrogen compounds). There may be also used, as the viscosity index improver, copolymers of ethylene and α-olefins (such as propylene, 1-butene and 1-pentene) and hydrides thereof, polyisobutylenes and hydrides thereof, a hydrogenated copolymer of styrene and diene, a copolymer of styrene and maleic anhydride and polyalkylstyrenes.

The molecular weight of the viscosity index improver needs to be selected in view of shear stability. For example, the number-average molecular weight of the viscosity index improver is desirably in a range of 5,000 to 1,000,000, more desirably 100,000 to 800,000, for dispersion or non-dispersion type polymethacrylates; in a range of 800 to 5,000 for polyisobutylenes and hydrides thereof; and in a range of 800 to 300,000, more desirably 10,000 to 200,000 for ethylene/α-olefin copolymers and hydrides thereof. The above viscosity index improving compounds can be used alone or in the form of a mixture of two or more thereof. The amount of the viscosity index improver is preferably 0.1 to 40.0% based on the total amount of the lubricating oil.

The friction modifier other than the above-mentioned (C) and (D) can be exemplified by metallic friction modifier such as boric acid ester, molybdenum dithiophosphate, molybdenum dithiocarbamate, molybdenum disulfide and the like.

The rust inhibitor can be exemplified by alkylbenzene sulfonates, dinonylnaphthalene sulfonates, esters of alkenylsuccinic acids and esters of polyhydric alcohols.

The nonionic surfactant and the deemulsifier can be exemplified by noionic polyalkylene glycol surfactants, such as polyoxyethylene alkylethers, polyoxyethylene alkylphenyleters and polyoxyethylene alkylnaphthyleters.

The metal deactivator can be exemplified by imidazoline, pyrimidine derivatives, thiadizol, benzotriazole, thiadiazole and the like.

The anti-foaming agent can be exemplified by silicones, fluorosilicones and fluoroalkylethers.

In case that these additives are contained in the low-friction agent composition used in the present invention, the contents of them are as follows: The friction modifier other than (C) and (D), the content of the rust inhibitor and demulsifier can be suitably selected from the range of 0.01 to 5% based on the total amount of the composition; and the content of the metal deactivator can be suitably selected from the range of 0.0005 to 1% based on the total amount of the composition.

In the next place, a friction reduction method according to the invention will be detailed.

In such a friction reduction method, between sliding surfaces made of a DLC coated sliding member (A) covered with diamond-like carbon and a sliding member (B) that uses a metal material, a non-metal material or a coated material obtained by coating a thin film on a surface thereof, and an arbitrary combination thereof, a low-friction agent composition is interposed, at least one kind selected from a group consisting of an oxygen-containing organic compound (C) and an aliphatic amine compound (D) being supplied between the sliding surfaces. Thereby, the low friction characteristics of various sliding surfaces can be improved.

Then, a manual transmission according to the invention will be detailed.

A manual transmission according to the invention uses the foregoing low-friction sliding mechanism and includes a sliding section formed by coating diamond-like carbon on at least one of sliding surfaces of sliding members that slide each other in the presence of the low-friction agent composition. Thereby, since the friction coefficient of the sliding section is reduced, the seizure resistance and the wear resistance are improved, and, because of low sliding resistance in the various sections, the fuel consumption of an automobile can be improved.

FIG. 1 is a sectional view showing an example of a sliding section in an automobile manual transmission according to the invention. A manual transmission 1 according to the invention includes, in a clutch housing, an input shaft 3 supported freely rotatably by two ball bearings 2a and 2b; and a main shaft 5 supported freely rotatably by a roller bearing 4a and a ball bearing 4b, to the input shaft a 3-speed input gear 3a and a 4-speed input gear 3b, respectively, being rotatably engaged through needle bearings 2c and 2d, a 5-speed input gear 3c being fixed.

On the other hand, to the main shaft 5, a 1-speed main gear 5a engaging with a gear 3d formed to the input shaft 3 and a 2-speed main gear 5b engaging with a gear 3e of the input shaft 3, respectively, are rotatably engaged through a needle bearing 4c and a needle bearing 4d attached through a 2-speed bush 6a. Furthermore, to the main shaft 5, a 5-speed main gear 5c engaging with a 5-speed input gear 3c of the input shaft 3 is rotatably engaged through a needle bearing 4e attached through a 5-speed bush 6b.

In the manual transmission 1 according to the invention, in a sliding section between an input shaft 3 and a needle bearing 2c of a 3-speed input gear 3a and on a surface on a side of the input shaft 3 in a sliding section between an input shaft 3 and a needle bearing 2d of a 4-speed input gear 3b, a hard carbon thin film can be coated. It goes without saying that a hard carbon thin film may be coated on surfaces of the needle bearings 2c and 2d, and hard carbon coat may be formed on both thereof.

Furthermore, as to the main shaft 5, a hard carbon thin film can be coated on a surface of a main shaft 5 in a sliding section between the main shaft 5 and a needle bearing 4c of the 1-speed main gear 5a; and on surfaces of bushes 6a and 6b in a sliding section between a 2-speed bush 6a of the main shaft 5 and a needle bearing 4d and in a sliding section between a 5-speed bush 6b and a needle bearing 4e. In this case as well, on a surface of the needle bearing 4a, 4b or 4e, or on both of sliding surfaces that contact and slide each other, a hard carbon thin coat can be formed.

On inner periphery surfaces of the 3-speed input gear 3a, 4-speed input gear 3b, 1-speed main gear 5a, 2-speed main gear 5b and 5-speed main gear 5c that contact and slide each other with the respective needle bearings 2c, 2d, 4c, 4d and 4e, respectively, a hard carbon coat may be desirably formed as needs arise.

In the above, an example is shown where on five sliding sections in total, that is, the 3-speed input gear 3a and 4-speed input gear 3b of the input shaft 3, the 1-speed main gear 5a of the main shaft 5, the 2-speed main gear 5b and the 5-speed main gear 5c, a hard carbon thin film is formed. The hard carbon thin film may be formed on other sliding sections such as the respective sliding sections of the ball bearings 2a, 2b, 4b and the roller bearing 4a that rotatably support the input shaft 3 and the main shaft 5.

Furthermore, the low-friction agent composition used in the manual transmission, when used on a sliding surface with a hard carbon thin film such as DLC, expresses very excellent low friction characteristics. However, in particular, in order to improve performance necessary as a working oil of the transmission, a metal base cleaning agent, an oxidation inhibitor, a viscosity index improver, other ash-free friction regulator, other ash-free dispersing agent, an abrasion inhibiting agent or an extreme pressure agent, a rust preventive, a nonionic surfactant, an anti-emulsifying agent, a metal deactivator and a defoaming agent, when added singularly or in a combination of several kinds thereof, can improve necessary performance.

In the next place, a final reduction gear unit according to the invention will be detailed.

The final reduction gear unit according to the invention uses the foregoing low-friction sliding mechanism and includes a sliding section formed by coating diamond-like carbon on at least one of sliding surfaces of sliding members that slide each other in the presence of the low-friction agent composition. Thereby, since the friction coefficient of the sliding section can be reduced, the seizure resistance and the wear resistance can be improved, and the sliding resistance of the various sections is low, the fuel consumption of an automobile can be improved.

Figure 2:
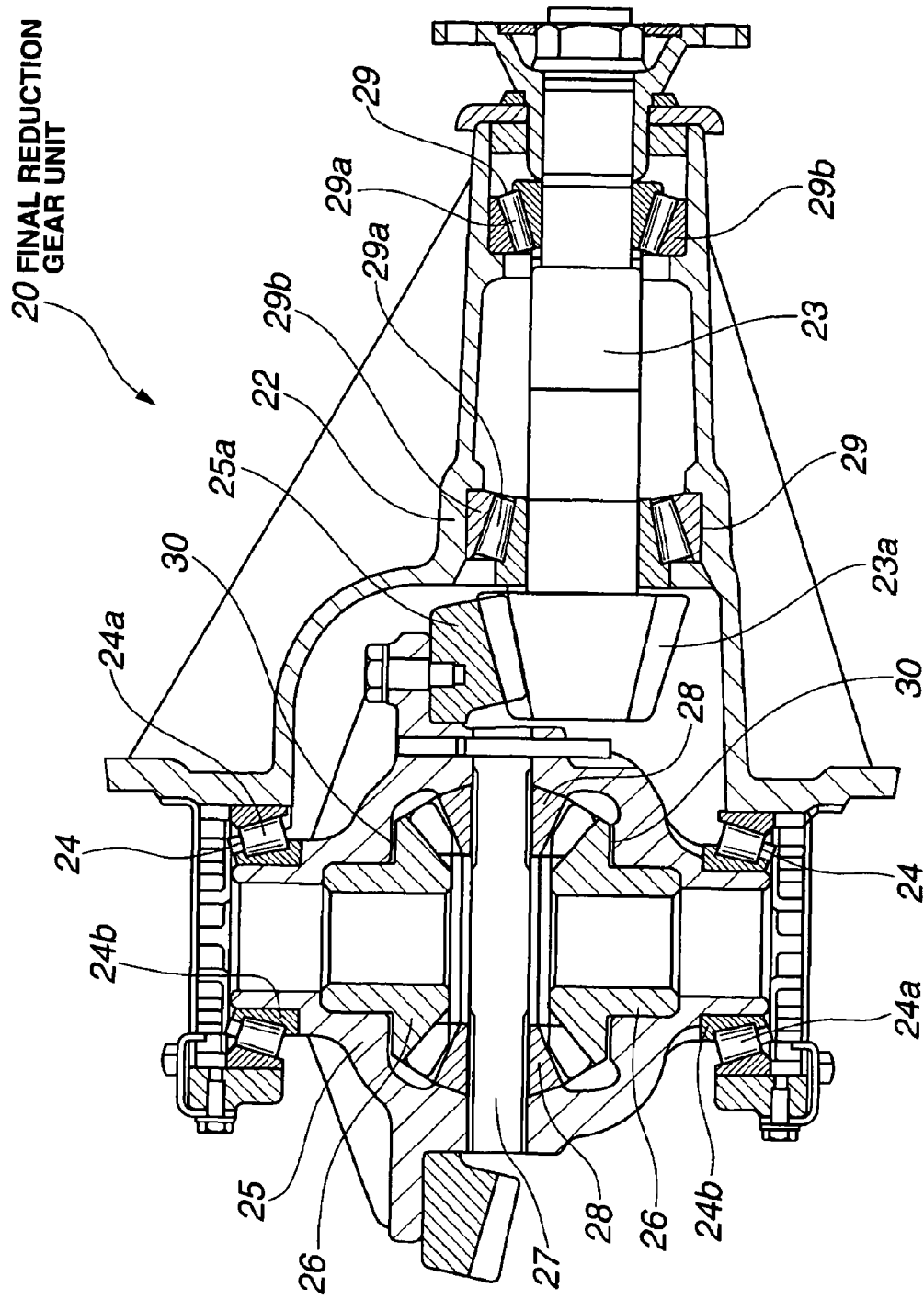
FIG. 2 is a sectional explanatory diagram exemplifying a sliding section covered with a hard carbon thin film in a final reduction gear unit according to the invention.

FIG. 2 is a sectional view showing an example of a sliding section in an automobile final reduction gear unit according to the invention. The final reduction gear unit 20 includes, in a differential carrier (reduction gear box) 22, a drive shaft 23 provided with a drive pinion 23a at a tip end thereof; a differential case 25 to which a ring gear 25a engaging with the drive pinion 23a is fixed and that is rotatably supported by the differential carrier 22 through a side bearing 24; two side gears 26 rotatably supported inside of the differential case 25; and two pinion mate gears 28 that are rotatably supported by a pinion mate shaft 27 inside of the differential case 25 and that engage with the side gears 26, respectively, the drive shaft 23 being rotatably supported by the differential carrier 22 through two roller bearings 29 and connected to a propeller shaft.

In the final reduction gear unit 20, when the propeller shaft is rotated, the rotation is transmitted through the drive pinion 23a and the ring gear 25a to the differential case 25. When a vehicle goes straight ahead, the differential case 25 integrally rotates with the side gear 26 and the pinion mate gear 28, and thereby left and right driving wheel axles rotate at the same speed.

On the other hand, when a vehicle approaches a curve, owing to an increase in the resistance of an inner axle, the side gear 26 and the pinion mate gear 28, respectively, rotate in the differential case 5, the rotation of the inner axle becomes slower, by just that much, the outer axle becomes larger in the rotation speed to enable to smoothly change a direction of the vehicle.

Now, as the sliding members in the final reduction gear unit 20, for instance, a roller 24a and an inner race 24b of a side bearing 24, a differential case 25, a side gear 26, a pinion mate shaft 27, a pinion mate gear 28 and a washer 30 that interposes between the differential case 25 and the side gear 26 to regulate a backlash can be cited. Sections between an end surface of a roller 24a and an inner race 24b of the side bearing 24, an inner surface and the side gear 26 of the differential case 25, an inner surface and a washer 30 of the differential case 25, a back surface and the washer 30 of the side gear 26, an outer periphery surface and the pinion mate gear 28 of the pinion mate shaft 27, and a back surface of the pinion mate gear 28 and an inner surface of the differential case 25 become sliding sections that slide each other in the presence of the low-friction agent composition for use in the final reduction gear unit. On one of the sliding surfaces of each of the sliding sections such as an end surface of the roller 24a in the side bearing 24, an inner surface of the differential case 25, an outer periphery surface of the pinion mate shaft 27 and a back surface of the pinion mate gear 28, and both surfaces of the washer 30, a hard carbon thin film can be coated. It goes without saying that a hard carbon thin film may be coated on a sliding surface of a counterpart of the sliding surface or on both of the sliding surfaces.

A hard carbon thin film may be coated on other sliding surfaces than the above such as end surfaces of a roller 29a in the roller bearing 29 that supports the drive shaft 23 and one or both of outer periphery surfaces of the inner race 29b.

Furthermore, the low-friction agent composition used in the manual transmission, when used on a sliding surface with a hard carbon thin film such as DLC, expresses very excellent low friction characteristics. However, in particular, in order to improve performance necessary as a working oil of the transmission, a metal base detergent, an oxidation inhibitor, a viscosity index improver, other ash-free modifier, other ashless dispersant, an abrasion inhibitor or an extreme pressure agent, a rust preventive, a nonionic surfactant, an anti-emulsifying agent, a metal deactivator and a defoaming agent, when added singularly or in a combination of several kinds thereof, can improve necessary performance.

EXAMPLES

In what follows, the invention will be more detailed with reference to Examples and Comparative Examples. However, the invention is not restricted to the examples.

1. Low-Friction Sliding Mechanism (Sliding Member)

Figure 3:
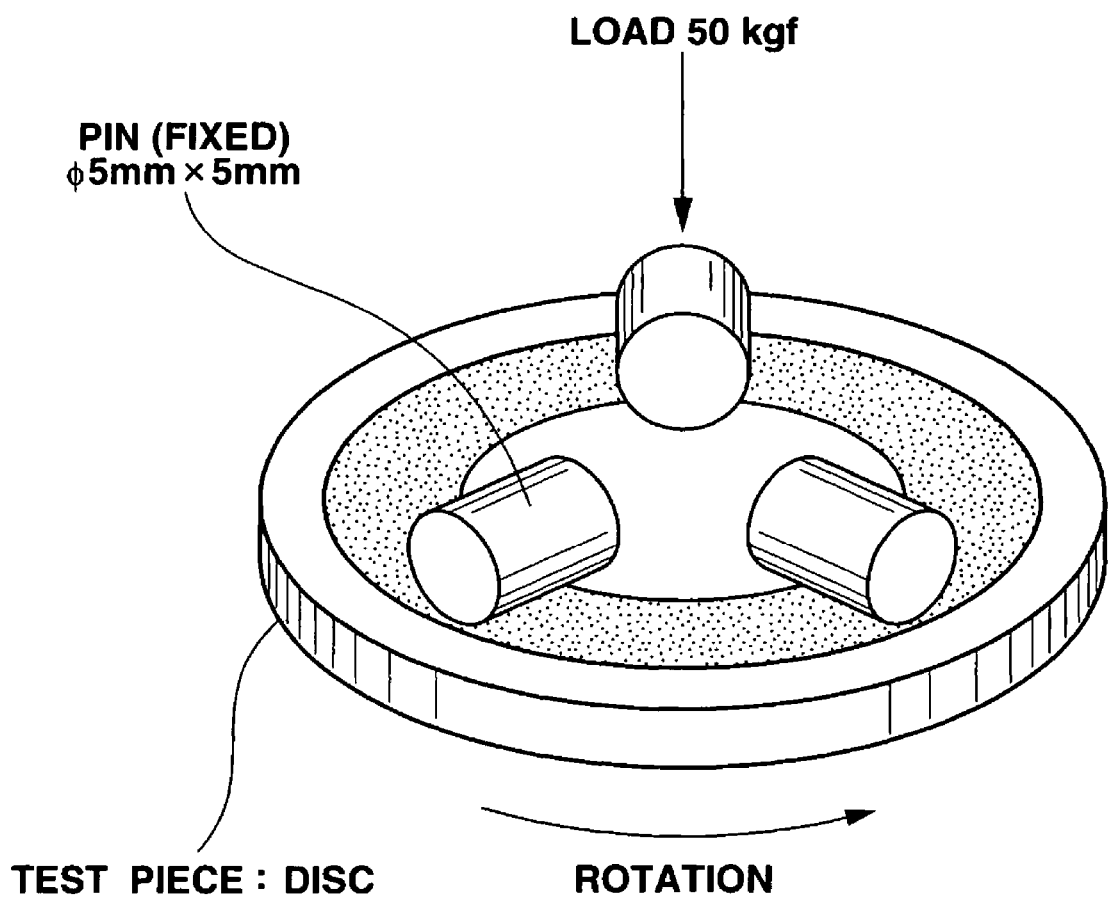
FIG. 3 is a schematic diagram showing an example of a pin-on-disc friction test.

As an example of a sliding member, a test piece for use in a simple pinion disc friction test as shown in FIG. 3 was prepared. The simple test piece includes three pins and a disc and is prepared with a sliding member obtained according to a method described below.

Pin Material

After polishing into a predetermined pin shape from a heat-treated SUJ2 material, polishing was applied with a lapping tape to finish pins into various surface roughnesses (Ra is 0.2 μm or less).

Disc Material

After disc-like raw materials made of a heat-treated SUJ2 material and an AC2A material were subjected to a predetermined aging process, a sliding surface with a pin was polished, followed by finishing to various surface roughnesses.

Surface Treatment

On surfaces of thus prepared pin materials and disc materials, by use of a PVD process or a CVD process that uses graphite as a target, materials (1) through (3) below were coated with various film thicknesses. Coated surfaces were further polished with a lapping tape and finished to various surface roughnesses (Ra is 0.1 μm or less).

(1) a-C . . . (PVD processing)
(2) DLC(a-C:H) . . . (CVD processing)
(3) CrN

The sliding members are shown in Table 1.

TABLE 1

| Example | Pin-on-disc Material | | | | Film Thickness (μm) | | Surface hardness | | Surface roughness Ra (μm) | | Sample Oil No. Used Lubricating oil | Friction Coefficient |
|---|---|---|---|---|---|---|---|---|---|---|---|---|
| | Disc | | Pin | | | | Disc | Pin | | | | |
| | Base material | Coating | Base material | Coating | Disc | Pin | Hv | Hv | Disc | Pin | | |
| Example 1 | Heat-treated SUJ2 Material | a-C | Heat-treated SUJ2 Material | None | 1.1 | | 1800 | 750 | 0.04 | 0.05 | 1 | 0.034 |
| Example 2 | Heat-treated SUJ2 Material | a-C | Heat-treated SUJ2 Material | a-C | 1.1 | 1.1 | 1800 | 1850 | 0.04 | 0.03 | 1 | 0.029 |
| Example 3 | Heat-treated SUJ2 Material | DLC(a-C:H) | Heat-treated SUJ2 Material | None | 2 | | 1650 | 750 | 0.03 | 0.03 | 1 | 0.055 |
| Example 4 | Heat-treated SUJ2 Material | DLC(a-C:H) | Heat-treated SUJ2 Material | DLC(a-C:H) | 2 | 1.8 | 1650 | 1500 | 0.03 | 0.03 | 1 | 0.049 |
| Example 5 | ACA2 | None | Heat-treated SUJ2 Material | a-C | | 0.8 | 80 | 1550 | 0.05 | 0.02 | 1 | 0.048 |
| Example 6 | Heat-treated SUJ2 Material | a-C | Heat-treated SUJ2 Material | None | 1.5 | | 2550 | 750 | 0.05 | 0.05 | 2 | 0.029 |
| Example 7 | Heat-treated SUJ2 Material | a-C | Heat-treated SUJ2 Material | None | 0.8 | | 1850 | 750 | 0.05 | 0.05 | 3 | 0.055 |
| Example 8 | Heat-treated SUJ2 Material | a-C | Heat-treated SUJ2 Material | None | 0.5 | | 1350 | 750 | 0.04 | 0.05 | 4 | 0.037 |
| Example 9 | Heat-treated SUJ2 Material | a-C | Heat-treated SUJ2 Material | None | 0.5 | | 1350 | 750 | 0.04 | 0.05 | 5 | 0.040 |
| Example 10 | Heat-treated SUJ2 Material | a-C | Heat-treated SUJ2 Material | None | 1.1 | | 1800 | 750 | 0.04 | 0.05 | 8 | 0.015 |
| Example 11 | Heat-treated SUJ2 Material | a-C | Heat-treated SUJ2 Material | None | 1.1 | | 1800 | 750 | 0.04 | 0.05 | 9 | 0.04 |
| Example 12 | Heat-treated SUJ2 Material | a-C | Heat-treated SUJ2 Material | None | 1.1 | | 1800 | 750 | 0.04 | 0.05 | 10 | 0.048 |
| Example 13 | Heat-treated SUJ2 Material | a-C | Heat-treated SUJ2 Material | None | 1.1 | | 1800 | 750 | 0.04 | 0.03 | 11 | 0.052 |
| Comparative Example 1 | Heat-treated SUJ2 Material | a-C | Heat-treated SUJ2 Material | None | 1.1 | | 1800 | 750 | 0.04 | 0.05 | 6 | 0.14 |
| Comparative Example 2 | Heat-treated SUJ2 Material | a-C | Heat-treated SUJ2 Material | None | 1.1 | | 1800 | 750 | 0.04 | 0.05 | 7 | 0.098 |
| Comparative Example 3 | Heat-treated SUJ2 Material | PVD/CrN | Heat-treated SUJ2 Material | None | 2.0 | 1.1 | 1700 | 750 | 0.04 | 0.03 | 4 | 0.132 |
| Comparative Example 4 | Heat-treated SUJ2 Material | PVD/CrN | Heat-treated SUJ2 Material | None | 2.0 | 1.1 | 1700 | 750 | 0.04 | 0.03 | 2 | 0.148 |
| Reference Example 1 | Heat-treated SUJ2 Material | PVD/CrN | Heat-treated SUJ2 Material | None | 2.0 | 1.1 | 1700 | 750 | 0.04 | 0.03 | 7 | 0.056 |

(Preparation of Low-Friction Agent Composition)

Sample Oil 1

As lubricating oil base oil, hydrogenated 1-decene oligomer (kinematic viscosity at 100° C.: 3.9 mm$^2$/s, viscosity index: 124 and total aromatic content: 0.0%) was used. Thereto, 1.0% of oleyl alcohol as an oxygen-containing organic compound, 13.0% of other additive (5.0% of ash-less dispersant: polybutenyl succinic imide (nitrogen content: 1.2%), metal base detergent: 0.5% of calcium sulfonate (total base number: 300 mgKOH/g and calcium content: 12.0%) and 0.9% of calcium phenate (total base number: 255 mgKOH/g and calcium content: 9.2%), a viscosity index improver, an oxidation inhibitor, an extreme pressure agent, a rust-preventive, an anti-emulsifying agent, a nonionic surfactant, a metal deactivator, a defoaming agent and the like) were blended to prepare.

Sample Oil 2

Except that 13.0% of other additive was not added, an operation same as sample 1 was repeated to prepare.

Sample Oil 3

Except that oleic acid was used as an oxygen-containing organic compound, an operation same as sample 1 was repeated to prepare.

Sample Oil 4

Except that 0.5% of oleyl alcohol and 0.5% of oleic acid were used as the oxygen-containing organic compound, an operation same as sample 1 was repeated to prepare.

Sample Oil 5

Except that with hydrocracked mineral oil (kinematic viscosity at 100° C.: 5.0 mm$^2$/S, the viscosity index: 120 and total aromatic content: 5.5%) as lubricating oil base oil, 1.0% of oleic acid amide was added as an oxygen-containing organic compound, an operation same as sample 1 was repeated to prepare.

Sample Oil 6

Commercially available engine oil of which kinematic viscosity at 100° C. is 10.2 mm$^2$/s was used.

Sample Oil 7

Except that in place of oleic acid amide 1.0% of molybdenum dithiocarbamate was added, an operation same as sample 5 was repeated to prepare.

Sample Oil 8

Glycerin (Glycol Anhydrous: 1,2,3-Propanetriol, Fluka, manufactured by Sigma Aldrich Japan Co., was used singularly (100%).

Sample Oil 9

A tri-ester (KAOLUBE KSL-268) of trimethylol propane and a mixture of aliphatic acids i-C8, n-C8, C10 and C11 was used singularly (100%).

Sample Oil 10

Except that 1.0% of glycol monooleyl ether was added as an oxygen-containing organic compound, an operation same as sample 5 was repeated to prepare.

Sample Oil 11

Glycerol mono-2-ethylhexyl ether was singularly used (100%).

Compositions and sample characteristics of the low-friction agent compositions are shown in Table 2.

gasoline engine and sample oil 6 is used, could obtain the friction reduction effect of substantially 50 to 70%.

Furthermore, from results of Examples 6 through 8, it is found that a hydroxyl group in the low-friction agent composition is excellent in the friction reduction effect.

TABLE 2

|  |  | Sample oil 1 | Sample oil 2 | Sample oil 3 | Sample oil 4 | Sample oil 5 | Sample oil 6[8] | Sample oil 7 | Sample oil 8 | Sample oil 9 | Sample oil 10 | Sample oil 11 |
|---|---|---|---|---|---|---|---|---|---|---|---|---|
| Synthetic Oil [1] | % by mass | 100 | 100 | 100 | 100 | — | unspecified | — | — | — | — | — |
| Mineral oil [2] | % by mass | — | — | — | — | 100 | | 100 | — | — | 100 | — |
| Oleyl alcohol [3] | % by mass | 1.00 | 1.00 | — | 0.50 | — | | — | — | — | — | — |
| Oleic acid [4] | % by mass | — | — | 1.00 | 0.50 | — | | — | — | — | — | — |
| Oleyl amide [5] | % by mass | — | — | — | — | 1.00 | | — | — | — | — | — |
| Molybdenum compound [6] | % by mass | — | — | — | — | — | | 1.00 | — | — | — | — |
| Glycerin [9] | % by mass | — | — | — | — | — | | — | 100 | — | — | — |
| Trimethylolpropane ester [10] | % by mass | — | — | — | — | — | | — | — | 100 | — | — |
| Glycerol monooleyl ether [11] | % by mass | — | — | — | — | — | | — | — | — | 1 | — |
| Glycerol mono-2-ethylhexyl ether [12] | % by mass | — | — | — | — | — | | — | — | — | — | 100 |
| Other additive [7] | % by mass | 13.0 | — | 13.0 | 13.0 | 13.0 | | 13.0 | — | — | 13.0 | — |
| Sample oil characteristics: Kinematic viscosity (100° C.) | mm$^2$/s | 10.2 | 3.9 | 10.2 | 10.3 | 10.3 | 10.2 | 10.3 | Unmeasured | 5.3 | 10.2 | Unmeasured |

[1] PAO (poly α-olefin) (kinematic viscosity at 100° C.: 3.9 mm$^2$/s, viscosity index: 124 and aromatic content: 0.0% by mass)
[2] Hydrocracked base oil (kinematic viscosity at 100° C.: 5.0 mm$^2$/s, viscosity index: 120 and aromatic content: 5.5% by mass)
[3] Oleyl alcohol
[4] Oleic acid
[5] Oleic acid amide
[6] Molybdenum dithiocarbamate (molybdenum content: 9.9% by mass)
[7] As other additives, ash-less dispersing agent, a viscosity index improver, an oxidation inhibitor, an extreme pressure agent, a rust-preventive, an anti-emulsifying agent, a nonionic surfactant, a metal deactivator and a defoaming agent are included.
[8] Commercially available SG oil
[9] Glycerin (Fluka 49707 Glycerol anhydrous: 1,2,3-Propanetriol)
[10] Trimethylol propane (trimethylol propane iso-C8, n-C8, C10, 11 ester)
[11] Glycerol monooleyl ether
[12] Glycerol mono-2-ethylhexyl ether Examples 1 Through 13

As shown in Table 1, the respective sliding members were combined, further with the respective low-friction agent compositions (the sample oils 1 through 5 and 8 through 11) described together in Table 1, low-friction sliding mechanisms were prepared, followed by carrying out a pin-on-disc friction test described below. Results thereof are shown together in Table 1.

[Pin-On-Disc Friction Test]
Pressure at maximum hertz: 80 MPa
Disc rotation speed: 30 rpm
Oil supply method: oil bath
Temperature of supplied oil: 80° C.
Test time period: 60 min Comparative Examples 1 Through 4

Similarly to examples, the respective sliding members were combined, further with the respective low-friction agent compositions (the sample oils 1, 2, 6 and 7) described together in Table 1, low-friction sliding mechanisms were prepared, followed by carrying out a pin-on-disc friction test. Results thereof are shown together in Table 1.

From Table 1, it is found that all combinations of the base materials and the sample oils obtained in Examples 1 through 13 show excellent low friction coefficients. For instance, these are, in comparison with Comparative Example 1 where a combination of a base material that is used in a general Still furthermore, from results of Examples 10 and 11, it is found that a compound having an alcoholic hydroxyl group is excellent in the friction reduction effect.

Test pieces obtained in Examples 1 through 11 each did not have any problem in a surface shape after the test, were very excellent in the wear resistance as well, and showed stable low friction characteristics.

A combination of a test piece base material and a low-friction agent composition according to Reference Example 1 is a combination where steel materials one of which is CrN-treated one and organic molybdenum that is said to be the most effective as the low-friction agent composition for sliding surfaces between steel materials are combined. As a result, the friction coefficient shows such a low value as substantially 0.06. This is inferred that similarly to a mechanism so far studied in various fields, a molybdenum disulfide film is formed on a sliding surface and thereby low friction is obtained. In the invention, the low friction is a target, and it is found that the low friction characteristics in the foregoing examples are very excellent.

Furthermore, a combination of the test piece base material and the low-friction agent composition according to Comparative Example 1 is a combination of general bearing steel and engine oil. As a result, the friction coefficient exceeds 0.1 to be poor in the friction characteristics. This can be assumed that the mechanism showing a low friction behavior suggested in the invention did not sufficiently work.

On the other hand, Comparative Example 2 is a combination where steel materials one of which is DLC-treated and sample oil blended with an organic molybdenum compound are combined. The friction coefficient was such high as substantially 0.1, that is, an advantage such as that of Example 2 was not obtained. This is inferred that the friction reduction mechanism is different from that of a sliding surface between existing steel materials.

Furthermore, Comparative Examples 3 and 4 are a combination where steel material obtained by applying a CrN treatment on a base material and used in Comparative Example 2 and sample oil used in the examples, that is, sample oil that can obtain the low friction effect when applied to steel materials one of which is DLC-treated are combined. As a result, the friction coefficient showed such a large value as exceeding 0.1. It is assumed that since this is a different combination from that of a metal material and sample oil shown in the invention, the lower friction cannot be achieved.

A combination of a test piece base material and a low-friction agent composition according to Reference Example 1 is a combination where steel materials one of which is CrN-treated and sample oil 7 where organic molybdenum that was most effective as the low-friction agent composition for sliding surfaces between existing steel materials was blended are combined. As a result, the friction coefficient shows such a low value as substantially 0.05. This is inferred that similarly to a mechanism so far studied in various fields, a molybdenum disulfide film was formed on a sliding surface and thereby low friction was obtained.

2. Manual Transmission

Figure 4:
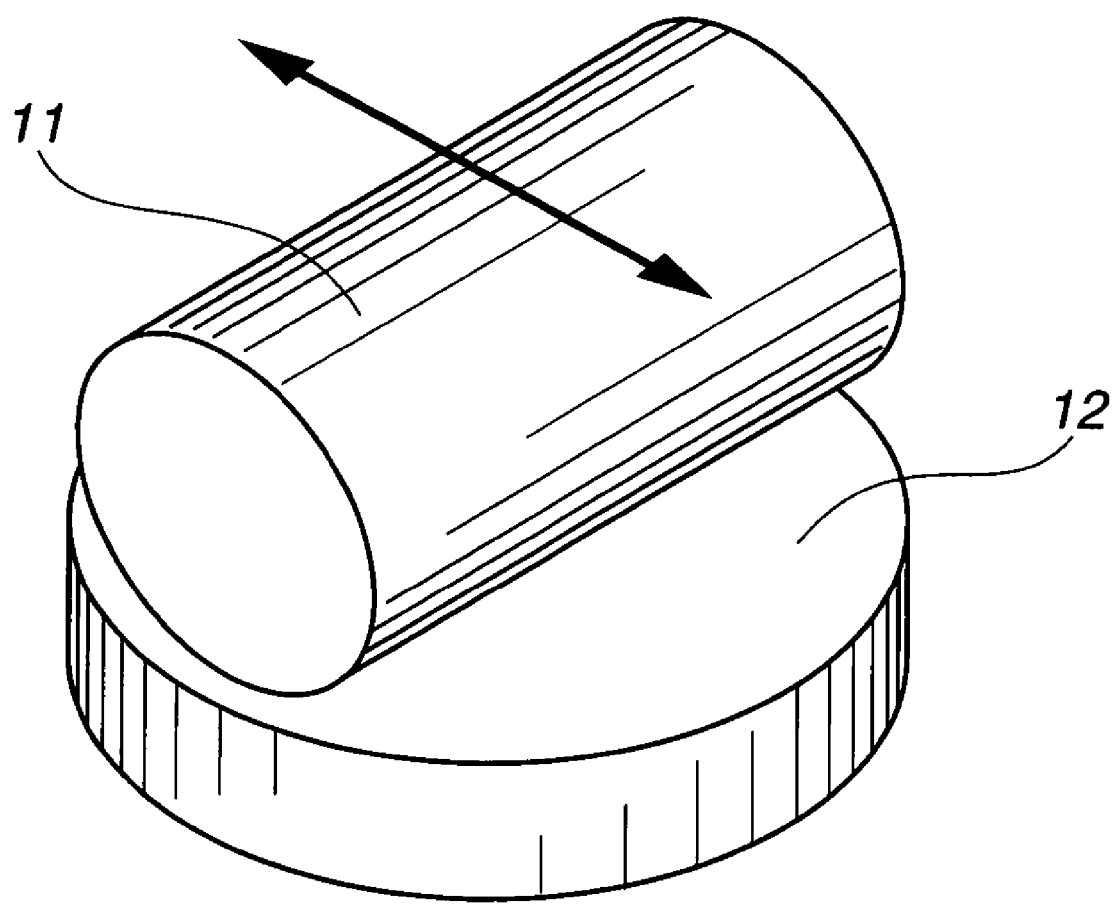
FIG. 4 is a perspective view showing a procedure of a cylinder-on-disc reciprocating dynamic friction test that is used in a friction test in an example according to the invention.

As shown in FIG. 4, with a cylinder-like test piece 11 as a sliding side test piece and a disc-like test piece 12 as a counterpart side test piece, a cylinder-on-disc reciprocating friction test was carried out, and, under the conditions shown below, the friction coefficient was measured.

[1] Friction Test Conditions

Test device: Cylinder-on-disc reciprocating friction tester
Sliding side test piece: φ15×22 mm cylinder-like test piece
Counterpart side test piece: φ24×7.9 mm disc-like test piece
Load: 400N (pressing load of the sliding side test piece)
Amplitude: 3.0 mm
Frequency: 50 Hz
Test temperature: 80° C.
Measurement time period: 30 min

[2] Preparation of Cylinder-Like Test Piece (Sliding Side)

With SUJ2 steel stipulated as high-carbon chromium bearing steel in JIS G4805 as a raw material, a cylinder-like test piece 11 that is a sliding side test piece was machined into the above dimension, followed by finishing to the surface roughness Ra of 0.04 µm.

w[3] Preparation of Disc-Like Test Piece (Sliding Counterpart Side)

Similarly, with SUJ2 steel, a disc-like test piece 12 that is a counterpart side test piece was machined to the dimension, after an upper sliding surface was finished to the surface roughness Ra of 0.05 µm, by means of a PVD arc ion type ion plating process, on a surface thereof, a DLC thin film where an amount of hydrogen atoms is 0.5 atomic percent or less, the Knoop hardness Hk is 2170 kg/mm$^2$, and the surface roughness Ry is 0.03 µm was deposited at a film thickness of 0.5 µm. In the Reference Example, one that was not coated with the DLC thin film was used.

[4] Preparation of Low-Friction Agent Composition for Use in Manual Transmission As a low-friction agent composition for use in a manual transmission, ones where to mineral oil or synthetic oil (PAO: poly-α-olefin (1-octene oligomer)) as base oil, SP (S and P-containing compound with 0.5% by mass of an amine salt of thiophosphoric acid) or ZnDTP (zinc dithiophosphate) extreme pressure agent (1.5% by mass as a compound), the wear resistance agent and an aliphatic ester or aliphatic amine friction modifier were respectively combined were prepared.

[5] Test Results

The cylinder-like test pieces and disc-like test pieces, and the low-friction agent compositions for use in the manual transmission were combined as shown in Table 3, followed by measuring the friction coefficients according to a procedure shown above.

Figure 5:
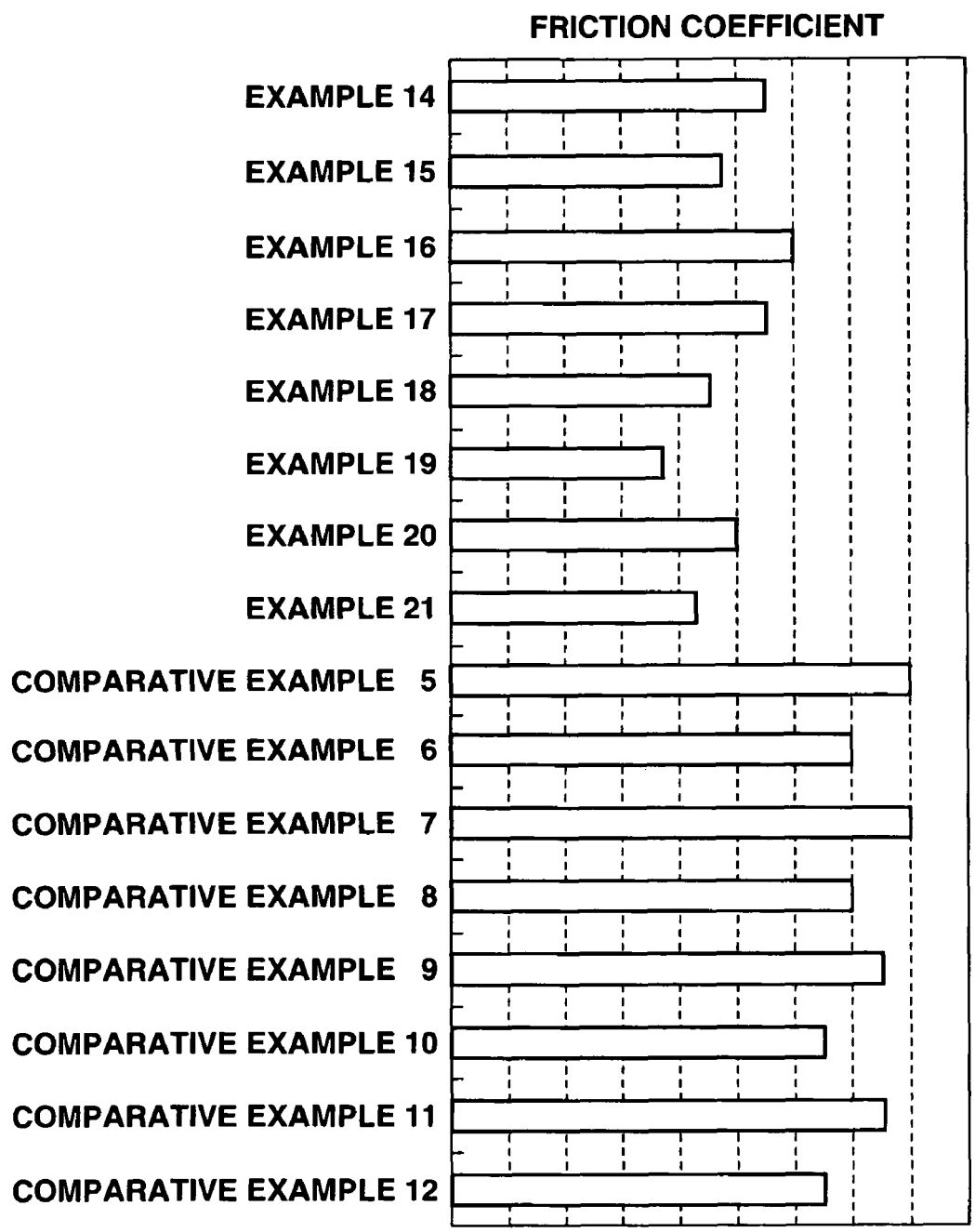
FIG. 5 is a graph showing comparing measurement results of the friction coefficients according to the cylinder-on-disc reciprocating dynamic friction test shown in FIG. 3.

Results are shown in FIG. 5.

TABLE 3

| | Disc-like test piece | | | Low-friction agent composition for manual transmission | | |
|---|---|---|---|---|---|---|
| Division | Raw material (DLC thin film) | Hydrogen content (at %) | Raw material of cylinder-like test piece | Base oil | Extreme pressure agent/wear resistant agent | Friction modifier |
| Example 14 | SUJ2 (Yes) | 0.5 | SUJ2 | Mineral oil | SP + ZnDTP system | Fatty ester |
| Example 15 | SUJ2 (Yes) | 0.5 | SUJ2 | Mineral oil | SP system | Fatty ester |
| Example 16 | SUJ2 (Yes) | 0.5 | SUJ2 | Mineral oil | SP + ZnDTP system | Aliphatic amine |
| Example 17 | SUJ2 (Yes) | 0.5 | SUJ2 | Mineral oil | SP system | Aliphatic amine |
| Example 18 | SUJ2 (Yes) | 0.5 | SUJ2 | PAO | SP + ZnDTP system | Fatty ester |
| Example 19 | SUJ2 (Yes) | 0.5 | SUJ2 | PAO | SP system | Fatty ester |
| Example 20 | SUJ2 (Yes) | 0.5 | SUJ2 | PAO | SP + ZnDTP system | Aliphatic amine |
| Example 21 | SUJ2 (Yes) | 0.5 | SUJ2 | PAO | SP system | Aliphatic amine |
| Comparative Example 5 | SUJ2 (No) | — | SUJ2 | Mineral oil | SP + ZnDTP system | Fatty ester |
| Comparative Example 6 | SUJ2 (No) | — | SUJ2 | Mineral oil | SP system | Fatty ester |
| Comparative Example 7 | SUJ2 (No) | — | SUJ2 | Mineral oil | SP + ZnDTP system | Aliphatic amine |
| Comparative Example 8 | SUJ2 (No) | — | SUJ2 | Mineral oil | SP system | Aliphatic amine |
| Comparative Example 9 | SUJ2 (No) | — | SUJ2 | PAO | SP + ZnDTP system | Fatty ester |
| Comparative Example 10 | SUJ2 (No) | — | SUJ2 | PAO | SP system | Fatty ester |
| Comparative Example 11 | SUJ2 (No) | — | SUJ2 | PAO | SP + ZnDTP system | Aliphatic amine |
| Comparative Example 12 | SUJ2 (No) | — | SUJ2 | PAO | SP system | Aliphatic amine |

As obvious from results of FIG. 5, it was confirmed that in examples where a disc-like test piece on a upper sliding surface of which a DLC thin film was deposited was used, in comparison with Comparative Examples where a disc-like test piece on which a DLC thin film was not deposited was used, the friction coefficient was largely lowered.

3. Final Reduction Gear Unit

As shown in FIG. 4, with a cylinder-like test piece 11 as a sliding side test piece and a disc-like test piece 12 as a counterpart side test piece, a cylinder-on-disc reciprocating friction test was carried out, and, under the conditions shown below, the friction coefficient was measured.

[1] Friction Test Conditions

Test device: Cylinder-on-disc reciprocating friction tester
Sliding side test piece: ϕ15×22 mm cylinder-like test piece
Counterpart side test piece: ϕ24×7.9 mm disc-like test piece
Load: 400N (pressing load of the sliding side test piece)
Amplitude: 3.0 mm
Frequency: 50 Hz
Test temperature: 80° C.
Measurement time period: 30 min

[2] Preparation of Cylinder-Like Test Piece (Sliding Side)

With SUJ2 steel stipulated as a high-carbon chromium bearing steel in JIS G4805 as a raw material, a cylinder-like test piece 11 that is a sliding side test piece was machined into the above dimension, followed by finishing to the surface roughness Ra of 0.04 μm.

[3] Preparation of Disc-Like Test Piece (Sliding Counterpart Side)

Similarly, with SUJ2 steel, a disc-like test piece 12 that is a counterpart side test piece was machined to the above dimension, after an upper sliding surface was finished to the surface roughness Ra of 0.05 μm, by means of a PVD arc ion type ion plating process, on a surface thereof, a DLC thin film where an amount of hydrogen atoms is 0.5 atomic percent or less, the Knoop hardness Hk is 2170 kg/mm$^2$, and the surface roughness Ry is 0.03 μm was deposited with a thickness of 0.5 μm. In the Reference Example, one that was not covered with the DLC thin film was used.

[4] Preparation of Low-Friction Agent Composition for Final Reduction Gear Unit

As a low-friction agent composition for use in a final reduction gear unit, ones where to mineral oil or synthetic oil (PAO: poly-α-olefin (1-octene oligomer)) as a base oil, S-base (4% by mass as a compound), SP-base (1.5% by mass as a compound) or borate-base extreme pressure agent (3% by mass as a compound), the wear resistance agent and an aliphatic ester friction modifier are respectively combined were prepared.

[5] Test Results

The cylinder-like test pieces and disc-like test pieces, and the low-friction agent compositions for use in the final reduction gear unit were combined as shown in Table 4, followed by measuring the friction coefficients according to a procedure shown below.

Figure 6:
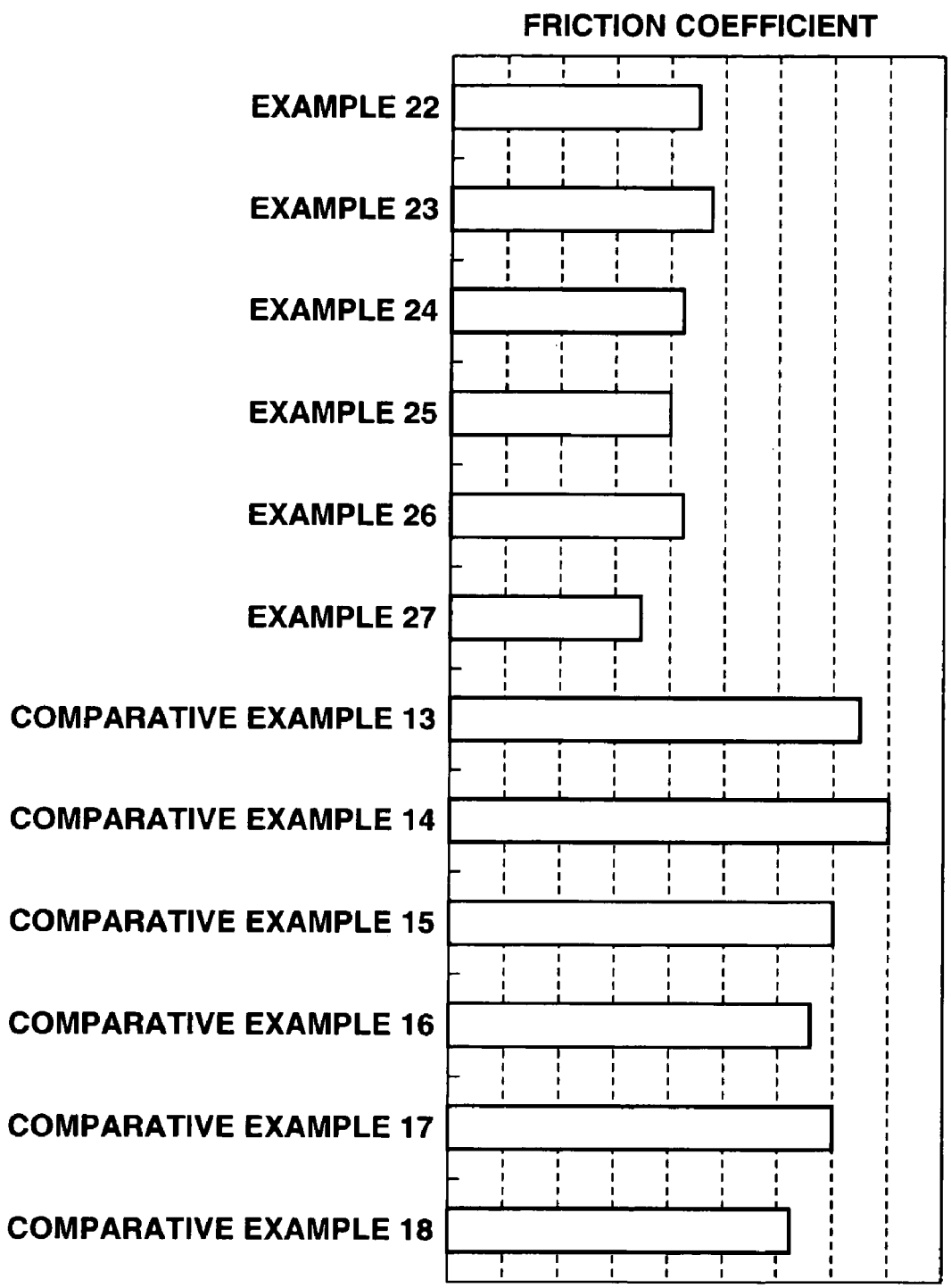
FIG. 6 is a graph showing comparing measurement results of the friction coefficients according to the cylinder-on-disc reciprocating dynamic friction test shown in FIG. 3.

Results are shown in FIG. 6.

As obvious from results of FIG. 6, it was confirmed that in examples where a disc-like test piece on a upper sliding surface of which a DLC thin film was deposited was used, in comparison with Comparative Examples where a disc-like test piece on which a DLC thin film was not deposited was used, the friction coefficient was largely lowered.

In the above, Examples and Comparative Examples according to the invention are more detailed; however, the invention is not restricted thereto, and, as far as it is within the gist of the invention, various modifications can be applied.

For instance, the invention can be applied to gear sliding members used in industrial machinery as well.

The invention claimed is:

1. A low-friction sliding mechanism wherein a low-friction agent composition is interposed between sliding surfaces of a DLC coated sliding member (A) and a sliding member (B), wherein
the DLC coated sliding member (A) is formed by coating diamond-like carbon having a hydrogen content of 20 atomic percent or less on a base material;
the sliding member (B) is formed of at least one kind of material selected from a group consisting of a metal material, a non-metal material and a coated material obtained by coating a thin film on a surface of the metal material or the non-metal material; and
the low-friction agent composition contains an oxygen-containing organic compound (C), the oxygen-containing organic compound (C) being at least one kind selected from a group consisting of alcohols, esters, ethers, ketones, aldehydes, carbonates and derivatives thereof,
wherein the oxygen-containing organic compound (C) is contained in the range of 0.05 to 3.0% mass relative to a total mass amount of the low-friction agent composition.

2. The low-friction sliding mechanism according to claim 1, wherein, in the sliding member (B), the metal material is at least one kind of material selected from a group consisting of a ferrous material, an aluminum alloy material and a magnesium alloy-based material; and the coated material is formed by coating a thin film of at least one kind of material selected from a group consisting of DLC, TiN and CrN.

3. A manual transmission characterized by using the low-friction sliding mechanism according to claim 1.

4. A final reduction gear unit characterized by using the low-friction sliding mechanism according to claim 1.

5. A low-friction agent composition that is used in the low-friction sliding mechanism according to claim 1.

TABLE 4

| Division | Disc-like test piece Raw material (DLC thin film) | Hydrogen content (at %) | Raw material of cylinder-like test piece | Low-friction agent composition for final reduction gear unit Base oil | Extreme pressure agent/wear resistant agent | Friction modifier |
|---|---|---|---|---|---|---|
| Example 22 | SUJ2 (Yes) | 0.5 | SUJ2 | Mineral oil | S system | Fatty ester |
| Example 23 | SUJ2 (Yes) | 0.5 | SUJ2 | Mineral oil | SP system | Fatty ester |
| Example 24 | SUJ2 (Yes) | 0.5 | SUJ2 | Mineral oil | Borate system | Fatty ester |
| Example 25 | SUJ2 (Yes) | 0.5 | SUJ2 | PAO | S system | Fatty ester |
| Example 26 | SUJ2 (Yes) | 0.5 | SUJ2 | PAO | SP system | Fatty ester |
| Example 27 | SUJ2 (Yes) | 0.5 | SUJ2 | PAO | Borate system | Fatty ester |
| Comparative Example 13 | SUJ2 (No) | — | SUJ2 | Mineral oil | S system | Fatty ester |
| Comparative Example 14 | SUJ2 (No) | — | SUJ2 | Mineral oil | SP system | Fatty ester |
| Comparative Example 15 | SUJ2 (No) | — | SUJ2 | Mineral oil | Borate system | Fatty ester |
| Comparative Example 16 | SUJ2 (No) | — | SUJ2 | PAO | S system | Fatty ester |
| Comparative Example 17 | SUJ2 (No) | — | SUJ2 | PAO | SP system | Fatty ester |
| Comparative Example 18 | SUJ2 (No) | — | SUJ2 | PAO | Borate system | Fatty ester |

6. A method of reducing a friction, comprising:
supplying a low-friction agent composition containing an oxygen-containing organic compound (C) on sliding surfaces of a DLC coated sliding member (A) and a sliding member (B),
wherein the DLC coated sliding member is formed by coating diamond-like carbon having a hydrogen content of 20 atomic percent or less on a base material,
wherein the sliding member (B) is formed of at least one kind of material selected from a group consisting of a metal material, a non-metal material and a coated material obtained by coating a thin film on a surface of the metal material or the non-metal material so as to lubricate the sliding surfaces,
wherein the oxygen-containing organic compound (C) is at least one kind selected from a group consisting of alcohols, esters, ethers, ketones, aldehydes, carbonates and derivates thereof,
wherein the oxygen-containing organic compound (C) is contained in the range of 0.05 to 3.0% mass relative to a total mass amount of the low-friction agent composition.

7. A low-friction agent composition that is used in the friction reduction method according to claim 6.

8. A low-friction sliding mechanism comprising a low-friction agent composition interposed between sliding surfaces of a DLC coated sliding member (A) and a sliding member (B), wherein:
the DLC coated sliding member (A) is formed by coating diamond-like carbon having a hydrogen content of 10 atomic percent or less on a base material,
the sliding member (B) is formed of at least one kind of material selected from a group consisting of a metal material, a non-metal material and a coated material obtained by coating a thin film on a surface of the metal material or the non-metal material,
the low-friction agent composition contains an oxygen-containing organic compound (C), the oxygen-containing organic compound (C) being at least one kind selected from a group consisting of alcohols, esters, ethers, ketones, aldehydes, carbonates and derivatives thereof, and,
the oxygen-containing organic compound (C) is contained in the range of 0.05 to 3.0% mass relative to a total mass amount of the low-friction agent composition.

9. A low-friction sliding mechanism comprising a low-friction agent composition interposed between sliding surfaces of a DLC coated sliding member (A) and a sliding member (B), wherein:
the DLC coated sliding member (A) is formed by coating diamond-like carbon having a hydrogen content of 0.5 atomic percent or less on a base material,
the sliding member (B) is formed of at least one kind selected from a group consisting of a metal material, a non-metal material and a coated material obtained by coating a thin film on a surface of the metal material or the non-metal material,
the low-friction agent composition contains an oxygen-containing organic compound (C), the oxygen-containing organic compound (C) being at least one kind selected from a group consisting of alcohols, esters, ethers, ketones, aldehydes, carbonates and derivatives thereof, and,
the oxygen-containing organic compound (C) is contained in the range of 0.05 to 3.0% mass relative to a total mass amount of the low-friction agent composition.

10. A low-friction sliding mechanism comprising a low-friction agent composition interposed between sliding surfaces of a DLC coated sliding member (A) and a sliding member (B), wherein:
the DLC coated sliding member (A) is formed by coating a-C diamond-like carbon that does not contain hydrogen,
the sliding member (B) is formed of at least one kind of material selected from a group consisting of a metal material, a non-metal material and a coated material obtained by coating a thin film on a surface of the metal material or the non-metal material,
the low-friction agent composition contains an oxygen-containing organic compound (C), the oxygen-containing organic compound (C) being at least one kind selected from a group consisting of alcohols, esters, ethers, ketones, aldehydes, carbonates and derivatives thereof, and,
the oxygen-containing organic compound (C) is contained in the range of 0.05 to 3.0% mass relative to a total mass amount of the low-friction agent composition.

11. A low-friction sliding mechanism wherein a low-friction agent composition is interposed between sliding surfaces of a DLC coated sliding member (A) and a sliding member (B), wherein:
the DLC coated sliding member (A) is formed by coating diamond-like carbon having a hydrogen content of 20 atomic percent or less on a base material,
the sliding member (B) is formed of at least one kind of material selected from a group consisting of a metal material, a non-metal material and a coated material obtained by coating a thin film on a surface of the metal material or the non-metal material,
the low-friction agent composition comprises an ester, the ester comprising at least one kind selected from the group consisting of glycerin monooleate, glycerin dioleate, sorbitan monooleate, sorbitan dioleate, and any combination of these, and
the ester is contained in the range of 0.05 to 3.0% mass relative to a total mass amount of the low-friction agent composition.

12. A manual transmission comprising a low-friction sliding mechanism wherein a low-friction agent composition is interposed between sliding surfaces of a DLC coated sliding member (A) and a sliding member (B), wherein
the DLC coated sliding member (A) is formed by coating diamond-like carbon having a hydrogen content of 20 atomic percent or less on a base material;
the sliding member (B) is formed with at least one kind of material selected from a group consisting of a metal material, a non-metal material and a coated material obtained by coating a thin film on a surface of the metal material or the non-meta material; and
the low-friction agent composition contains an oxygen-containing organic compound (C), the oxygen-containing organic compound (C) being at least one selected from a group consisting of alcohols, esters, ethers, ketones, aldehydes, carbonates and derivatives thereof,
wherein the oxygen-containing organic compound (C) is contained in the range of 0.05 to 3.0% mass relative to a total mass amount of the low friction agent composition,
wherein the DLC coated sliding member is an input shaft of the manual transmission, the input shaft being formed by coating diamond-like carbon having a hydrogen content of 20 atomic percent or less on a base material.

13. A final reduction gear unit comprising a low-friction sliding mechanism wherein a low-friction agent composition is interposed between sliding surfaces of a DLC coated sliding member (A) and a sliding member (B), wherein
  the DLC coated sliding member (A) is formed by coating diamond-like carbon having a hydrogen content of 20 atomic percent or less on a base material;
  the sliding member (B) is formed with at least one kind of material selected from a group consisting of a metal material, a non-metal material and a coated material obtained by coating a thin film on a surface of the metal material or the non-metal material; and
  the low-friction agent composition contains an oxygen-containing organic compound (C), the oxygen-containing organic compound (C) being at least one selected from a group consisting of alcohols, esters, ethers, ketones, aldehydes, carbonates and derivatives thereof,
  wherein the oxygen-containing organic compound (C) is contained in the range of 0.05 to 3.0% mass relative to a total mass amount of the low-friction agent composition,
  wherein the DLC coated sliding member is a member selected from the group consisting of a roller of a side bearing, a differential case, a pinion mate shaft, a pinion mate gear, a washer and a roller of a roller bearing for supporting a drive shaft, the selected member being formed by coating diamond-like carbon having a hydrogen content of 20 atomic percent or less on a base material,
  wherein the coated material of the sliding member (B) is obtained by coating diamond-like carbon having a hydrogen content of 20 atomic percent or less on the surface of the metal material or the non-metal material.

14. A final reduction gear unit as claimed in claim 13, wherein the diamond-like carbon is coated at an end face of the roller of the side bearing, an inner surface of the differential case, an outer peripheral surface of the pinion mate shaft, a back surface of the pinion mater gear, both surfaces of the washer, or an end surface of the roller of the roller bearing for supporting the drive shaft, wherein the diamond-like carbon is coated at a sliding surface of the sliding member (B).

* * * * *